United States Patent
Donelli et al.

(10) Patent No.: US 10,496,357 B2
(45) Date of Patent: Dec. 3, 2019

(54) EVENT LATENCY MITIGATION AND SCREEN SELECTION

(71) Applicant: Astro HQ LLC, Minnetonka, MN (US)

(72) Inventors: Giovanni Donelli, San Francisco, CA (US); Matt Ronge, Minnetonka, MN (US)

(73) Assignee: Astro HQ LLC, Minnetonka, MN (US)

( * ) Notice: Subject to any disclaimer, the term of this patent is extended or adjusted under 35 U.S.C. 154(b) by 0 days.

(21) Appl. No.: 16/371,281

(22) Filed: Apr. 1, 2019

(65) Prior Publication Data

US 2019/0324706 A1 Oct. 24, 2019

Related U.S. Application Data

(63) Continuation of application No. 15/356,238, filed on Nov. 18, 2016, now Pat. No. 10,289,373.

(60) Provisional application No. 62/297,035, filed on Feb. 18, 2016.

(51) Int. Cl.
*G06F 3/14* (2006.01)
*G06T 11/20* (2006.01)

(52) U.S. Cl.
CPC .......... *G06F 3/1454* (2013.01); *G06F 3/1462* (2013.01); *G06T 11/20* (2013.01); *G09G 2370/022* (2013.01)

(58) Field of Classification Search
None
See application file for complete search history.

(56) References Cited

U.S. PATENT DOCUMENTS

| | | | |
|---|---|---|---|
| 5,818,425 A | 10/1998 | Want et al. | |
| 10,289,373 B2 | 5/2019 | Donelli et al. | |
| 2003/0012222 A1 | 1/2003 | Rinchiuso et al. | |
| 2007/0113112 A1 | 5/2007 | Ishii | |
| 2009/0037515 A1 | 2/2009 | Zapata et al. | |
| 2009/0235170 A1 | 9/2009 | Golden et al. | |
| 2013/0321306 A1* | 12/2013 | Bauermeister | G06F 3/017 345/173 |
| 2013/0335333 A1 | 12/2013 | Kukulski et al. | |
| 2014/0193094 A1 | 7/2014 | Shin et al. | |

(Continued)

OTHER PUBLICATIONS

"U.S. Appl. No. 15/356,238, Non Final Office Action dated Dec. 12, 2017", 36 pgs.

(Continued)

*Primary Examiner* — Frank S Chen
(74) *Attorney, Agent, or Firm* — Schwegman Lundberg & Woessner, P.A.

(57) ABSTRACT

In an embodiment, the system includes a direct input device (the "client") executing a client application ("app"), a secondary device (the "server") executing a server app, and a network link between the server and the client. The server app transmits to the client app, via the network link, a portion of the content displayed on the server's computer screen. The client app may display this portion. Whenever the user interacts with the client device, the client app transmits those interactions to the server app over the network link. The server app sends an acknowledgement to the client app and provides the received interactions to the spatial input software executing on the server, and the spatial input software consumes the interactions as if the user performed the interactions on the server device itself.

20 Claims, 12 Drawing Sheets

(56) References Cited

U.S. PATENT DOCUMENTS

| | | |
|---|---|---|
| 2014/0223490 A1 | 8/2014 | Pan et al. |
| 2014/0365856 A1 | 12/2014 | Costa-requena et al. |
| 2016/0379385 A1* | 12/2016 | Tu .......................... G06F 3/1454 345/441 |
| 2017/0099560 A1 | 4/2017 | Perlmutter et al. |
| 2017/0169054 A1 | 6/2017 | Imler et al. |
| 2017/0243560 A1 | 8/2017 | Donelli |

OTHER PUBLICATIONS

"U.S. Appl. No. 15/356,238, Examiner Interview Summary dated Mar. 28, 2018", 3 pgs.

"U.S. Appl. No. 15/356,238, Response filed Apr. 12, 2018 to Non Final Office Action dated Dec. 12, 2017", 13 pgs.

"U.S. Appl. No. 15/356,238, Final Office Action dated Jun. 19, 2018", 39 pgs.

"U.S. Appl. No. 15/356,238, Response filed Oct. 17, 2018 to Final Office Action dated Jun. 19, 2018", 11 pgs.

"U.S. Appl. No. 15/356,238, Advisory Action dated Oct. 25, 2018", 3 pgs.

"U.S. Appl. No. 15/356,238, Notice of Allowance dated Dec. 26, 2018", 7 pgs.

* cited by examiner

EVENT LATENCY MITIGATION AND SCREEN SELECTION

PRIORITY CLAIM

This patent application is a continuation of U.S. application Ser. No. 15/356,238, filed Nov. 18, 2016, which claims the benefit of priority, under 35 U.S.C. Section 119 to U.S. Provisional Patent Application Ser. No. 62/297,035, entitled "EVENT LATENCY MITIGATION AND SCREEN SELECTION," filed on Feb. 18, 2016 to Donelli et al, all of which are hereby incorporated by reference herein in their entirety.

TECHNICAL FIELD

Embodiments pertain to improved synchronization between two computing devices. Some embodiments relate to latency mitigation and screen selection when one computing device is used as an input device for a second computing device over a computer network.

BACKGROUND

Small and portable computing devices with sensitive touch screen displays have become ubiquitous. These devices often feature networking capabilities that allow it to send and receive data over one or more computer networks. Example networking capabilities include communication over Wireless Local Area Networks (WLANs) such as according to an 802.11 family of standards, communication over cellular networks such as according to a Long Term Evolution (LTE) family of standards, short range communications to a BLUETOOTH standard or by using Near Field Communications (NFC), and the like. Example computing devices include tablet computers such as an APPLE® IPAD®, a MICROSOFT® SURFACE® and the like.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments or examples discussed in the present document.

DETAILED DESCRIPTION

Figure 1:
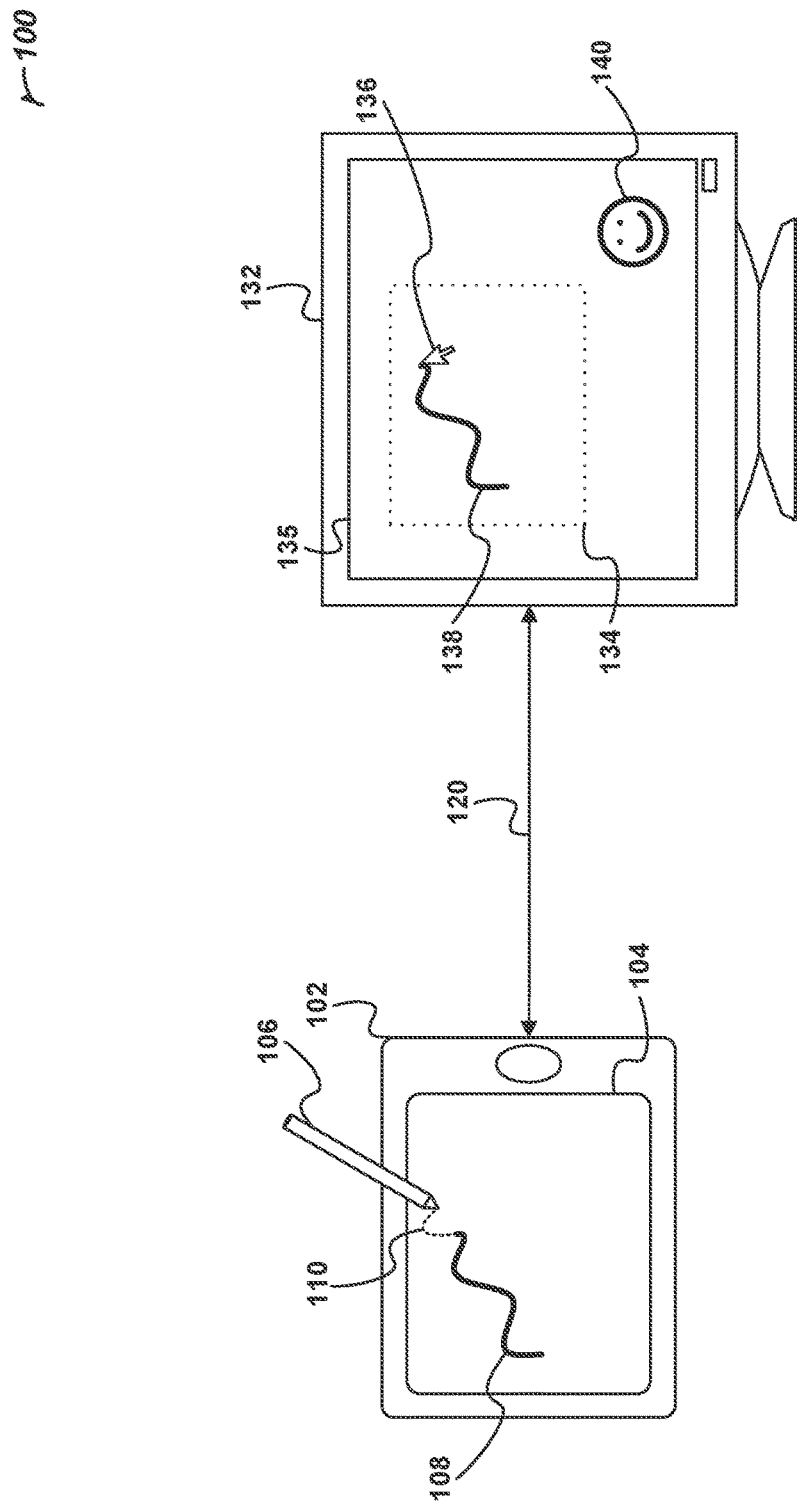
FIG. 1 illustrates a system for using a direct input device with spatial input software executing on a server device, according to an embodiment.

With some types of software programs, pen/stylus-based input is more natural than other forms of input. Such software programs, termed "spatial input" software, include but are not limited to: drawing, photo editing, painting, illustration, computer-aided design/drafting ("CAD"), video editing, three-dimensional ("3D") modeling, animation, graphic design, industrial design, 3D sculpting, motion graphics, annotation and collaboration, and note taking. Some existing digital pens/styli allow the pen/stylus to be used on almost any surface (e.g., a table or desk). Such pens/styli are often referred to as "indirect input devices" because the input space (e.g., the pen/stylus on a table or desk) does not coincide with the display space (e.g., a computer screen). For many users, however, using indirect input devices with spatial input software may be awkward because the user is unable to view the input space and display space simultaneously. A "direct input device" is a device where the input space coincides with the display space. Example direct input devices include devices with touchscreens (e.g., tablets and smartphones), pen displays, etc.

Users of spatial input software often prefer to use a combination of a direct input device and a secondary device; the direct input device is used for input and immediate visual output, while the secondary device executes the spatial input software. For example, the direct input device may be a tablet computer with a touchscreen and the secondary device may be a desktop computer executing spatial input software. However, a particular spatial input software may not be compatible with a particular direct input device that a user may want to use. Embodiments disclosed herein may allow a user to use a direct input device despite the spatial software program's incompatibility with the direct input device.

In an embodiment, the system includes a direct input device (the "client") executing a client application ("app"), a secondary device (the "server") executing a server app, and a network link between the server and the client. The server app transmits to the client app, via the network link, a portion of the content displayed on the server's computer screen. The client app may display this portion. Whenever the user interacts with the client device, the client app transmits those interactions to the server app over the network link. The server app sends an acknowledgement to the client app and provides the received interactions to the spatial input software executing on the server, and the spatial input software consumes the interactions as if the user performed the interactions on the server device itself. Once the server app consumes these inputs, the inputs are then reflected in the content displayed on the server's computer screen and thus will be sent to the client.

The display of the server is typically larger than the display of the client; sometimes the server's display is many times larger than the client's display. Scaling the entire contents of the server's display to fit the client's display may produce negative results. First, user interface elements that are appropriately sized on the server's display may be too small when scaled onto the client device for the user to interact with effectively. Second, a small input movement on the client device scales to a much larger input movement on the server, thus impeding precise input movements. Embodiments disclosed herein may include a screen selection feature that allows a user to select a portion of the secondary device's display that is to be mirrored onto the display of the direct input device.

The use of network communications between the server and the client introduces several potential problems, such as variable network latency (e.g., the amount of time it takes for a packet of data from one network node to another), network jitter (e.g., variation in the delay of received data packets), and data packet loss. The client display is a copy of the server display and it may take time to send the input to the server, process the input on the server, and send back an updated display. If the network delay or server processing delay is significant, the display output on the client device may appear to lag or jump, thus degrading the user experience and making some tasks, such as drawing, unacceptably difficult.

Network conditions are difficult to predict, even for a simple network of one server and one client device. To ameliorate the effects of poor network conditions on the user experience, a concept of "interim input" may be introduced. Interim input is client device input that the client app has sent to the server app and for which the client app has received an acknowledgement from the server app, but which may not yet have been consumed by the spatial input software executing on the server. This could occur for various reasons, for example the spatial input software may be performing time-consuming processing.

The client application may render the interim input over the rendering of the server's display on the client device at the input location. The client application may display interim input distinctly from input already consumed by the server. A server that consumes the input updates the rendering of the display on the server. This updated rendering is then propagated to the client, where it will be displayed as rendered by the server. Distinctly displaying the interim input may be the result of the client application not having knowledge of the way the input is to be rendered at the server (e.g., line color, line thickness, brush patterns, alpha values, and the like). In other examples, distinctly displaying the interim input may be intentional to provide a visual cue to the user that the input is not yet consumed. For example, if the regular input is a solid line, the interim input may be displayed as a dashed line. As another example, if the regular input is a black line, the interim input may be displayed as a magenta line. The interim input is displayed for a sufficient amount of time to hide the network latency; after this time has elapsed, the interim input is no longer rendered by the client as the input is displayed as regular input (as the server has "caught up" and is now sending the input rendered as part of the data describing the server display). This interim input hides the lag that normally would occur waiting for the server to consume the input and send a new display to the client.

In other examples, rather than displaying the interim input distinctly, the client may determine one or more characteristics of the interim input to match the interim input with nearby previously consumed input. For example, if the user is drawing a line, the client may attempt to match the interim input portion of the line with the portion of the line already consumed by the server. It may do this by reading characteristics of pixels corresponding to consumed input that are adjacent (e.g., within a predetermined threshold) to the location of the interim input in the data describing the server's display (e.g., MPEG or other display frame). These characteristics may be used to match the characteristics of nearby consumed input. Characteristics may include color, line thickness, brush patterns, alpha values, and the like. The interim input may then be rendered using these characteristics.

The amount of time to display the interim input may be a specified value. Under severely poor network conditions, a concept of "unacknowledged input" may be introduced to further ameliorate the effects of poor network conditions on the user experience. Unacknowledged input is a portion of the client device input that the client app has transmitted to the server app, but for which the client app has not received an acknowledgement from the server app. In some examples, the unacknowledged input may be displayed distinctly from the interim input and displayed distinctly from the regular input. For example, if the interim input is displayed as a dashed line, the unacknowledged input may be displayed as a dotted line. As another example, if the interim input is displayed as a magenta line, the unacknowledged input may be displayed as a red line. Upon the client app receiving from the server app an acknowledgement for a portion of the unacknowledged input, that portion of the unacknowledged input becomes interim input, and is displayed accordingly. In other examples, the unacknowledged input may be displayed the same as interim input. In some examples, the unacknowledged input may also be matched to nearby consumed input as previously described for interim input.

FIG. 1 illustrates a system 100 for using a direct input device with spatial input software executing on a server device, according to an embodiment. The system 100 includes a client device 102, a server device 132, and a network link 120. The client device 102 executes the client app and the server device 132 executes the spatial input software and the server app. The client device 102 may be a tablet computer, a smartphone, a pen display, or any other direct input device. The server device 132 may be a desktop computer, a laptop computer, a computer server, or any other type of computer that executes the spatial input software and the server app. The server device 132 may communicate with one or more input devices (not shown), such as a keyboard, a mouse, touchpad, a trackball, etc.

The network link 120 may be a wired link or a wireless link. A wired link may be a Universal Serial Bus (USB) link, an Ethernet link, an RS-232 (serial) link, etc. A wireless link may be an Institute for Electrical and Electronics Engineers (IEEE) 802.11 (Wi-Fi) link, an infrared link, a Bluetooth link, etc. The physical distance separating the client device 102 from the server device 132 may range from as little as a few inches to as much as thousands of miles. Network communications over network link 120 may be compressed, encrypted, or both. Furthermore, the network link 120 may be multiple network links within a network, within multiple networks, or even the Internet.

Being a direct input device, the client device 102 includes a client display 104 that accepts input as well as displays output. The client display 104 may accept input from a variety of spatial input devices 106, such as a pen, a stylus, a finger or thumb, etc. The server device 132 includes a server display 135, which may or may not accept input directly. The client display 104 has an aspect ratio, termed a "client aspect ratio," which represents the relation between the width of client display 104 and the height of client display 104. The server display 135 has an aspect ratio, termed a "server aspect ratio," which represents the relation between the width of server display 135 and the height of server display 135. The client aspect ratio and the server aspect ratio may or may not be equivalent. In an embodiment, if the client aspect ratio and the server aspect ratio are different, a letterbox may be added around the content to be displayed on the client display 104.

A user may select a portion of the server display 135, on which the user would like to work. This may be useful, for example, if the user was drawing in a graphics program and only needed the canvas but not the surrounding tool palettes to be displayed on the client display 104. A selected display portion 134 of the server display 135 is displayed on the client display 104. Content displayed outside of the selected display portion 134 of the server display 135, such as smiley face 140, is not displayed on the client display 104. In an embodiment, the selected display portion 134 has an aspect ratio fixed to the aspect ratio of the client display 104. A user may use the client device 102 or the server device 132 to modify the selected display portion 134 of server display 135, for example by panning or zooming the selected display portion 134 of server display 135.

To select the selected display portion 134 of the server display 135, an interface may be provided that appears to sit on top of the display and appears as a graphics tool selection (e.g., the "marching ants"). Using this interface, the user is able to drag and resize this selection to change the selected display portion 134 of the server display 135 that is to be displayed on the client display 104. The selected display portion 134 may be changed from the client display 104 in real-time (or near real-time) by providing the user an interface element on the client display 104 that switches the mode of the selected display portion 134. If the selected display portion 134 is in the "move" mode, the user may use the client display 104 to pan or zoom the selected display portion 134, which modifies the selected display portion 134 of the server display 135.

When a user changes the selected display portion 134 using the client display 104, the client device 102 sends deltas to the server device 132. For example, using the client display 104 to move the selected display portion 134 up by 100 pixels and across by 150 pixels would result in a delta of (150, 100) being sent by the client device 102 to the server device 132. The server device 132 receives the deltas and adjusts the selected display portion 134 of the server display 135 appropriately. Deltas are also sent to the server device 132 when a user changes the size of the selected display portion 134 via the client display 104. In an embodiment, if the selected display portion 134 is moved outside the bounds of the display, the portion outside the bounds of the display is displayed as black.

After the selected display portion 134 has been selected, the server device 132 begins mirroring the selected display portion 134 to the client device 102. A video codec is used to send the data across the network link 120. In an embodiment, mirroring is performed by the following process:

1. The server device 132 copies the frame buffer of the server display 135.
2. The server device 132 cuts out the selected display portion 134 from the frame buffer copy and scales the selected display portion 134 to fit the client display 104.
3. The server device 132 feeds the new frame, which corresponds to the selected display portion 134, into a video codec (e.g., Moving Pictures Experts Group (MPEG) MPEG-2, H.264, Motion Joint Photographic Experts Group (Motion JPEG), etc.), which compresses it.
4. The server device 132 divides the compressed output into datagrams for transmission to the client device 102.
5. The server device 132 transmits the datagrams to the client device 102.
6. The client device 102 reassembles the datagrams into one large data block.
7. The client device 102 feeds the one large data block into a video codec, which decompresses it.
8. The decompressed output is blitted to the client display 104.

This process is performed repeatedly and quickly (e.g., up to 60 frames per second) to make the client display 104 feel responsive to the user.

The selected display portion 134 not only defines the portion of the server display 135 to be mirrored onto client display 104, but also defines a mapping of interactive events on the client display 104 to the server device 132. The client device 102 might not be aware of the mapping at all. Instead, the client device 102 sends both its screen size and the raw input event information to the server device 132. The server device 132 knows the position of the selected display portion 134 relative to the server display 135, and scales/maps the received input events to fit within the selected display portion 134 of server display 135. After scaling/mapping an input event, the spatial input software executing on server device 132 consumes the scaled/mapped input event as if it was generated by an input device connected to the server device 132:

1. On initial connection, the client device 102 sends the size of the client display 104 to server device 132 across network link 120.
2. A user-initiated input event occurs on the client device 102 (e.g., a touch/pen stroke generating position data).
3. The client device 102 sends the input event across network link 120 to server device 132.
4. The server device 132 uses the ratio of the client display size/selected display portion 134 to scale the input event (e.g., client's X1, Y1 scaled to server's X2, Y2).
5. The server device 132 translates the client's X,Y origin so that it aligns with the selected display portion 134.
6. The scaled input event is delivered through a system Application Programming Interface (API) so that spatial input software executing on the server device 132 consumes the scaled/mapped input event as if it was generated by an input device connected to the server device 132. For example, a system API provided by an operating system.

This process may be performed for each input event generated by client device 102 that contains X,Y position information.

Figure 1B:
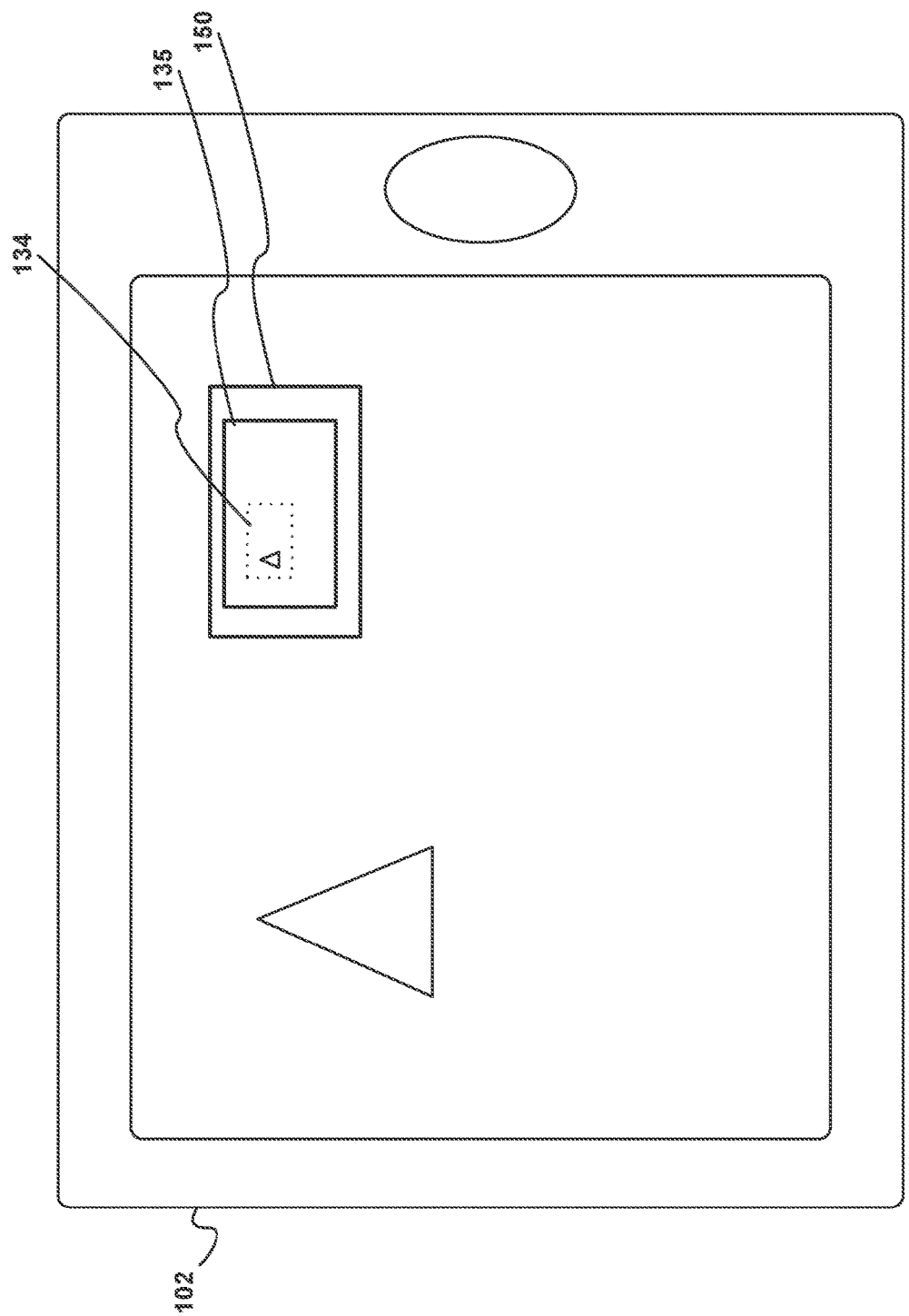
FIG. 1B illustrates a navigator which shows a miniature replica of the entire server display, that may be displayed on the client display according to an embodiment.

In an embodiment illustrated in FIG. 1B, a navigator 150, which shows a miniature replica of the entire server display 135, may be displayed on the client display 104. Interactions with (e.g., inputs directed to) the navigator 150, via client display 104, may move or resize the selected display portion 134 of the server display 135 and cause a corresponding change in the selected display portion that is displayed on the client display 104. The server device 132 sends to the client device 102 a small thumbnail image of the entire server display 135 and the coordinates of the selected display portion 134. The client display 104 would render the thumbnail and render the selected display portion 134 on top of (e.g., in front of) the thumbnail. Any interactions with the navigator 150 would cause deltas in the X, Y directions to be sent to the server device 132, as described above.

Figure 2:
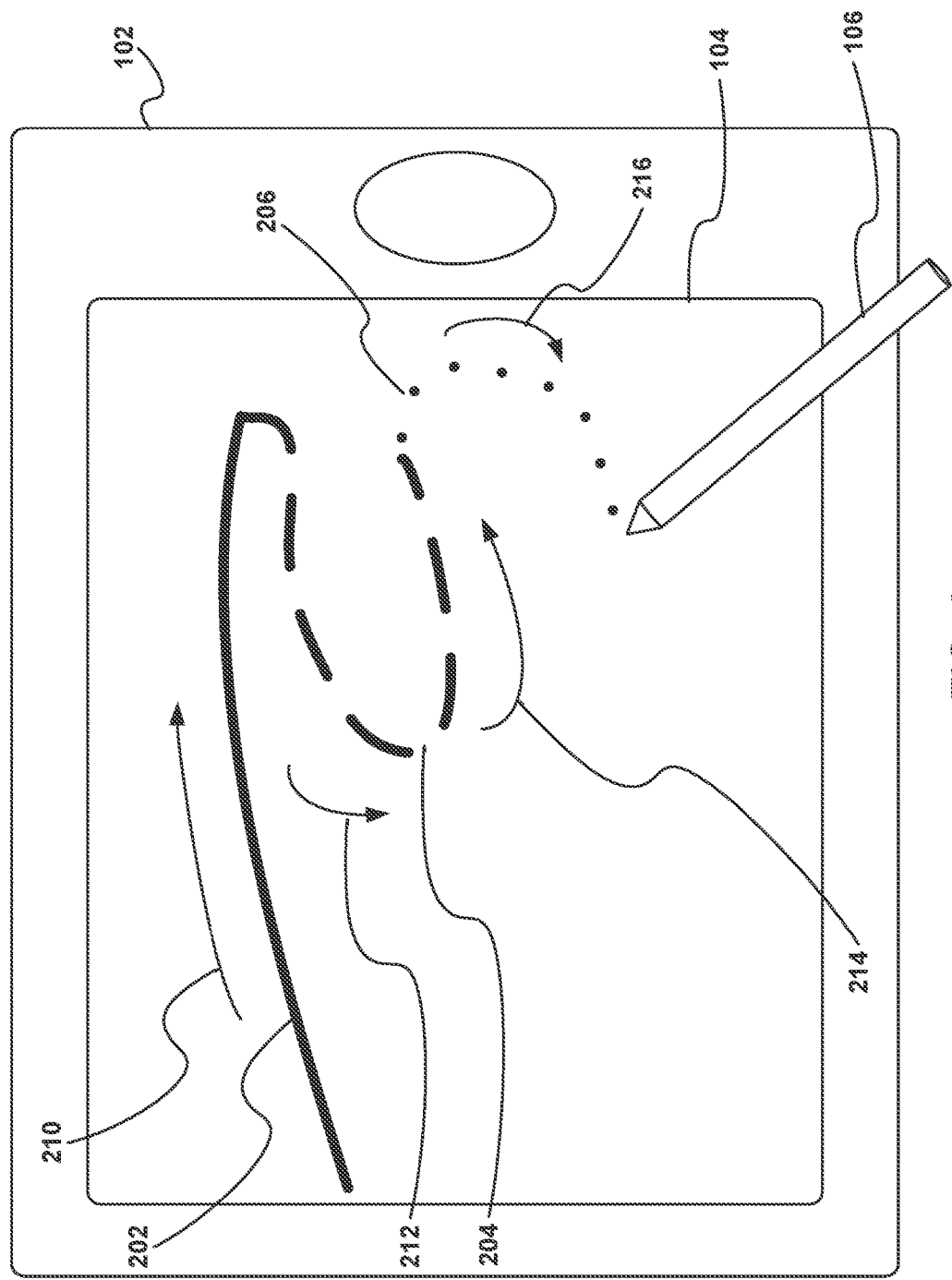
FIG. 2 illustrates a series of user inputs onto the client device, according to an embodiment.

Returning to FIG. 1, a spatial input device 106, such as a stylus or a user's finger (not shown), may be used by the user to input data into the client device 102. As the user inputs data into client device 102, the client app transmits the input data to the server device 132 over the network link 120. Upon receiving the transmitted input data, the server app sends an acknowledgement to the client device 102 over the network link 120, maps the received input data to server input data corresponding to the selected display portion 134, and provides the server input data to the spatial input software executing on the server device 132. The spatial input software consumes the server input data as if the user input the server input data on the server device 132 itself. For example, server device 132 draws line 138 as a result of the user drawing line 108 on client device 102. Once the server 132 consumes the input data, the input data may be reflected on the server's display, which is then forwarded to the client for display on the client display. In some examples, prior to this happening, the client app displays the input 110 on client display 104. As shown in FIG. 2, how the client app displays the input may depend on the state of the input on the server device 132. Pointer 136 shows a current position of an input device on the server device 132.

FIG. 2 illustrates a series of user inputs onto the client device 102, according to an embodiment. The series of user inputs are in the form of a freeform drawn line, which is displayed as a series of connected line segments 202, 204, 206. Arrows 210, 212, 214, and 216 show the chronological motions of the spatial input device 106 used to input the freeform drawn line.

First line segment 202 is displayed as a solid line, denoting that the first line segment 202 is "regular input." The second line segment 204 is displayed as a dashed line, denoting that the second line segment 204 is "interim input." The third line segment 206 is displayed as a dotted line, denoting that the third line segment 206 is "unacknowledged input."

The amount of time to display the interim input may be a specified value, for example 125 ms; after the specified amount of time has elapsed, the interim input is no longer specially rendered by the client (hopefully the server has consumed the input and sent an update of the server display such that the interim input is displayed as regular input). The length of the displayed interim input may be proportional to how much data is input during this specified amount of time; thus, the more data that is input during this specified amount of time, the longer the length of the displayed interim input line. To provide the user with a visual reminder of the status of a portion of input, the interim input may be displayed distinctly from the regular input. For example, in FIG. 2, the regular input is first line segment 202 and is displayed as a solid line whereas the interim input is second line segment 204 and is displayed as a dashed line.

When the conditions of network link 120 is particularly poor, acknowledgements from the server device 132 for a portion of the input data might not be received by the client app before the client device 102 renders the input data portion on the client display 104. In such circumstances, the portion(s) of the input data are "unacknowledged input," and may be displayed distinctly from both the interim input and the regular input. For example, in FIG. 2, the unacknowledged input is third line segment 206 and is displayed as a dotted line. When the client app receives an acknowledgement from the server device 132 for a portion of the unacknowledged input, that portion of the unacknowledged input becomes interim input and is displayed as interim input.

Figure 3:
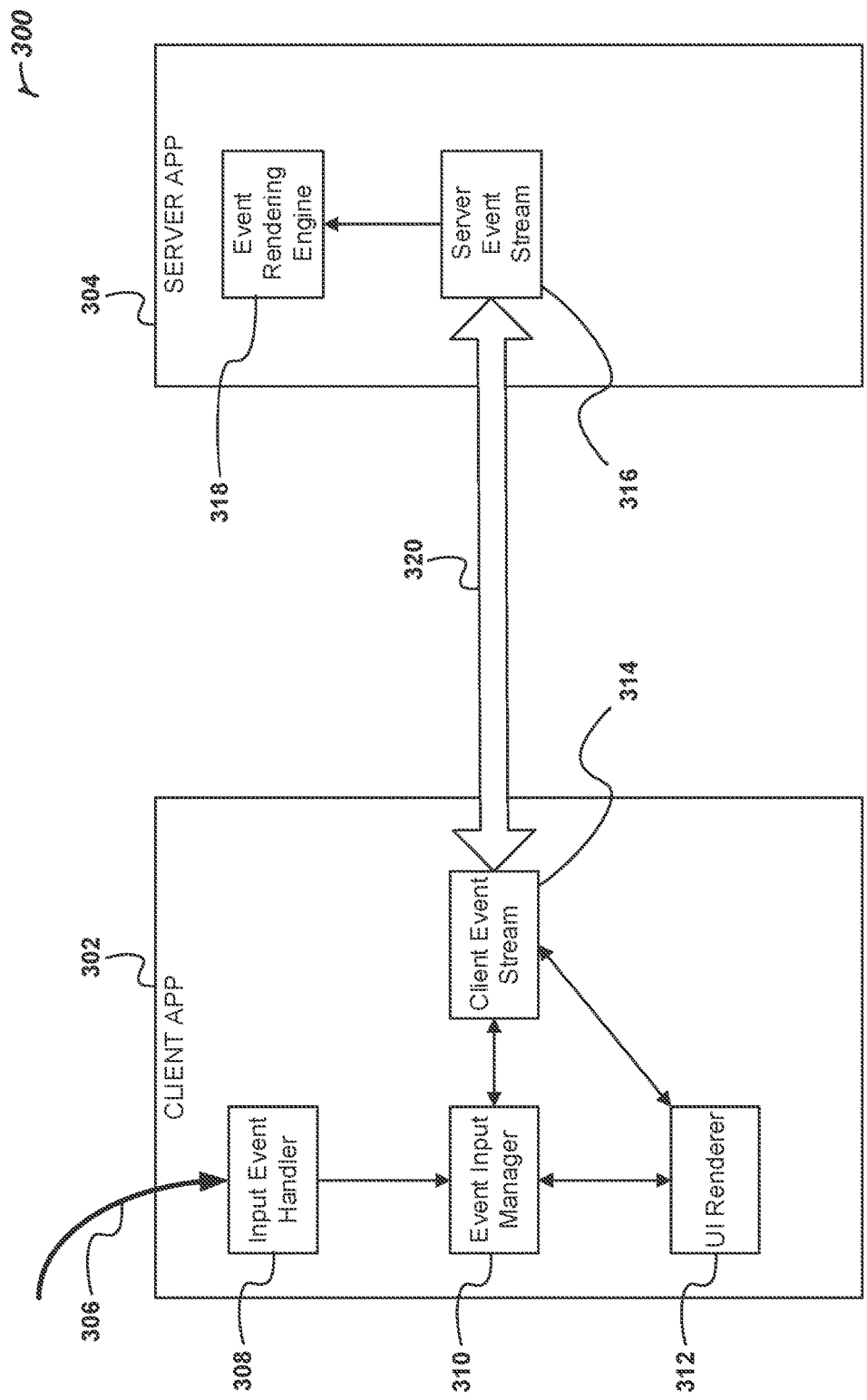
FIG. 3 illustrates how input events flow within the system, according to an embodiment.

FIG. 3 illustrates how inputs events flow within the system 100, according to an embodiment. The diagram illustrates the client app 302 executing on the client device 102, the server app 304 executing on server device 132, and network communications protocol 320 operating over network link 120.

When the client app 302 and the server app 304 are started, the two apps 302, 304 begin a "pairing" process in which they find each other via network link 120. Upon completing the pairing process, the client app 302 and the server app 304 are ready to perform the functions described below. A user session is a period of time starting at the pairing of the client app 302 and the server app 304 and ending at the disconnect between the client app 302 and the server app 304. When the user is finished using the spatial input software, the user may end the user session by closing the client app 302 and/or the server app 304.

Input event 306 represents an instance of data input into client device 102. The input event 306 may be a drawing input, a keyboard input, a gesture input, etc. The event input event 306 is passed to input event handler 308. The input event handler 308 may be code that is written for a specific spatial input device 106 (e.g., a specific stylus, any stylus from a particular manufacturer, etc.). The input event handler 308 contains code for communicating with the spatial input device 106. The input event handler 308 passes the input event 306 to event input manager 310.

Event input manager 310 dispatches the input event 306 to the UI renderer 312 and client EventStream 314. The UI renderer 312 is responsible for rendering input events 306 on the client device 102. The client EventStream 314 is responsible for sending input events 306 across the network link 120 to the server EventStream 316 executing within the server app 304 on server device 132.

Upon receiving an input event 306 from the client EventStream 314, the server EventStream 316 sends an acknowledgement to the client EventStream 314 and dispatches the received input event 306 to the event rendering engine 318. Event rendering engine 318 consumes the received input event 306 and replays it on the server device 132 as if the received input event 306 was actually input onto server device 132. For example, event rendering engine 318 would convert a drawing input event received by server EventStream 316 into one or more "mouse down" and "mouse move" events on server device 132.

In some examples, the client EventStream 314 and the server EventStream 316 communicate with each other in real-time (or near real-time); thus, the client EventStream 314 and the server EventStream 316 use a real-time (or near real-time) communications protocol over network link 120. If network link 120 is an Internet Protocol (IP) based network (whether wired or wireless), the client EventStream 314 and the server EventStream 316 may send messages (called datagrams) to each other via the User Datagram Protocol (UDP). Since UDP does not guarantee packet (datagram) delivery, order, or duplicate protection; the client EventStream 314 and the server EventStream 316 may be configured to handle these situations appropriately. If network link 120 is a Bluetooth connection, the client EventStream 314 and the server EventStream 316 may communicate using the Bluetooth equivalent of UDP.

Event input manager 310 may also maintain an event history. The event history may include a history of input events 306 received from input event handler 308, a history of input events 306 sent to the server app 304 executing on server device 132, and a history of acknowledgements received from the server app 304 executing on server device 132. The event history may be a buffer, an array, a queue, or any other data structure suitable for its purpose.

When an input event 306 is passed to the event input manager 310, the event input manager 310 adds the input event 306 to the event history. The event input manager 310 may be informed by the client EventStream 314 when the client EventStream 314 receives from the server EventStream 316 an acknowledgement that the server EventStream 316 has received an input event 306. Upon receipt of the acknowledgement, the event input manager 310 marks the corresponding input event 306 for removal from its event history and starts a timer for that input event 306. The timer is set to a specified amount of time (e.g., 150 ms). When the timer for a corresponding acknowledged input event 306 expires, the event input manager 310 removes the corresponding acknowledged input event 306 from the event history.

The UI renderer 312 uses the acknowledged input events 306 within the event history of event input manager 310 to render the interim input. If necessary, the UI renderer 312 uses the unacknowledged input events 306 to render the unacknowledged input.

Figure 4:
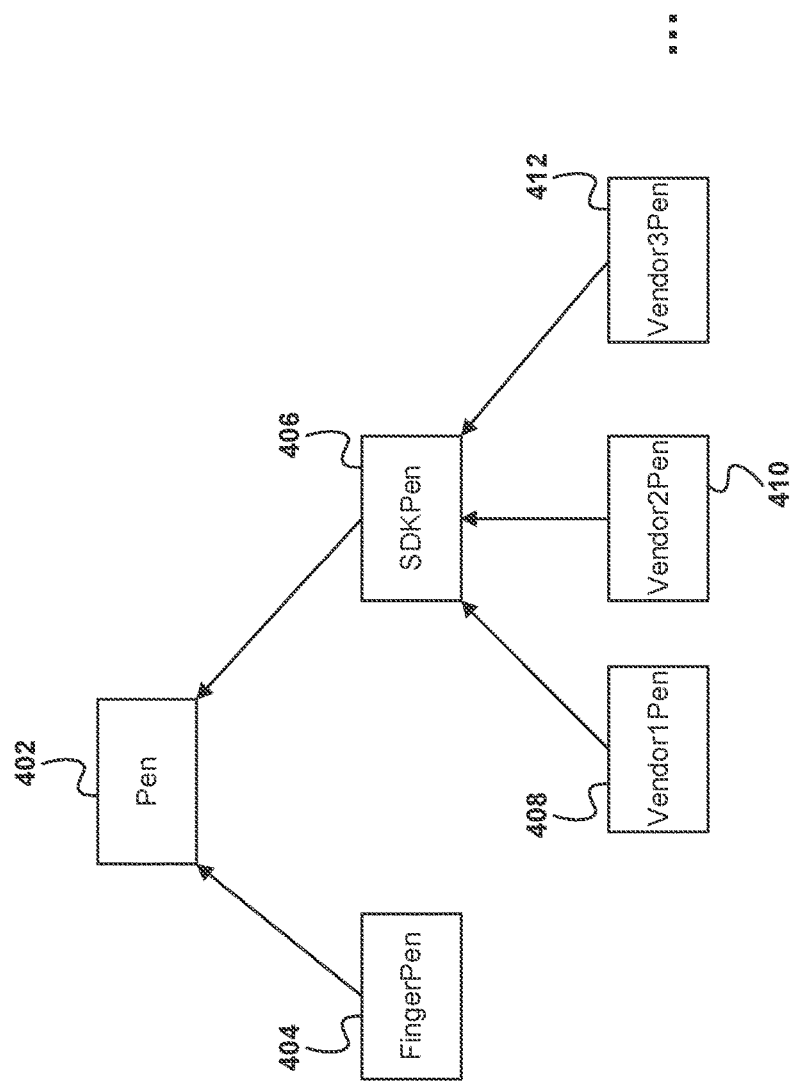
FIG. 4 is a portion of a class diagram illustrating relationships amongst input device classes for various pens/styli, according to an embodiment.

FIG. 4 is a portion of a class diagram illustrating relationships amongst object-oriented classes for various spatial input devices 106, according to an embodiment. Each class may be responsible for communicating with its corresponding hardware and for producing corresponding events. In some examples, the parent class Pen 402 is the base class, from which all 44 other pens/styli classes inherit. The Pen 402 class may include methods and/or variables that are common to all pens/styli.

The FingerPen 404 class is responsible for producing events when the user produces an input event with the user's finger/thumb. All manufactured pens/styli (e.g., not human fingers/thumbs) inherit from the SDKPen 406 class, which may include methods and/or variables that are common to all manufactured pens/styli. Each manufacturer of pens/styli may have one or more vendor-specific subclasses 408, 410, 412 that is specific to that vendor's pens/styli.

When a stylus is paired with the client app 302, the client app 302 activates the appropriate subclass so that the subclass can begin communicating with the stylus hardware and producing input events 306.

Events

An input event 306 is represented by an event structure.

```
typedef enum {
    EventUnknown,
    EventStrokeBegin,
    EventStrokePoint,
    EventStrokeEnd,
    EventKeyPressed,
    . . .
} EventType;
```

The EventType enumeration enumerates various event types that may be generated by the spatial input device 106. An input event 306 with an EventStrokeBegin event type denotes that the input event 306 was the first input event 306 of an input stroke on client device 102. An input event 306 with an EventStrokeEnd event type denotes that the input event 306 was the last input event 306 (e.g., the finger/pen/stylus was lifted off of the client display 104) of the corresponding input stroke on client device 102. An input event 306 with an EventStrokePoint event type denotes that the input event 306 was neither the first nor the last input event 306 of the corresponding pen stroke on client device 102.

```
typedef struct {
    integer identifier;
    EventType eventType;
} EventHeaderStruct;
```

Each input event 306 may include an EventHeaderStruct structure, which may include the event type and an identifier for the input event 306. The identifier may be an integer, may be signed or unsigned, and may be of an appropriate length (e.g., 32-bit, 64-bit, 128-bit, etc.) to uniquely identify an input event 306 within a user session. Within a user session, the identifier is incremented to accommodate the next input event 306. In an embodiment, the identifier is incremented monotonically.

```
typedef struct {
    float x;
    float y;
    #ifdef 3D_ENABLED
    float z;
    #endif
    float pressure;
    #ifdef TILT_ENABLED
    float tiltX;
    float tiltY;
    #endif
} EventPointStruct;
```

Each input event 306 may include an EventPointStruct structure, which includes various values for the input event 306. For example, the EventPointStruct structure includes values x and y, which denote the x and y coordinates of the input event 306 on a Cartesian coordinate system corresponding to the client display 104. If the input space of the client device 102 is three-dimensional, the EventPointStruct structure may include a value for the z coordinate. If either the client device 102 or the spatial input device 106 has a sensor to detect the pressure with which an event was input, the EventPointStruct structure may include a value for pressure. If either the client device 102 or the spatial input device 106 has a sensor to detect a tilt of the spatial input device 106 when the spatial input device 106 produced the input event 306, the EventPointStruct structure may include a value for tiltX and/or tiltY relative to the client device 102. The various values of the EventPointStruct structure may be floating point values.

```
typedef struct {
    EventHeaderStruct header;
    EventPointStruct point;
} EventStruct;
```

Each input event 306 may be represented by an EventStruct structure, which includes an EventHeaderStruct structure and an EventPointStruct structure.

Figure 5:
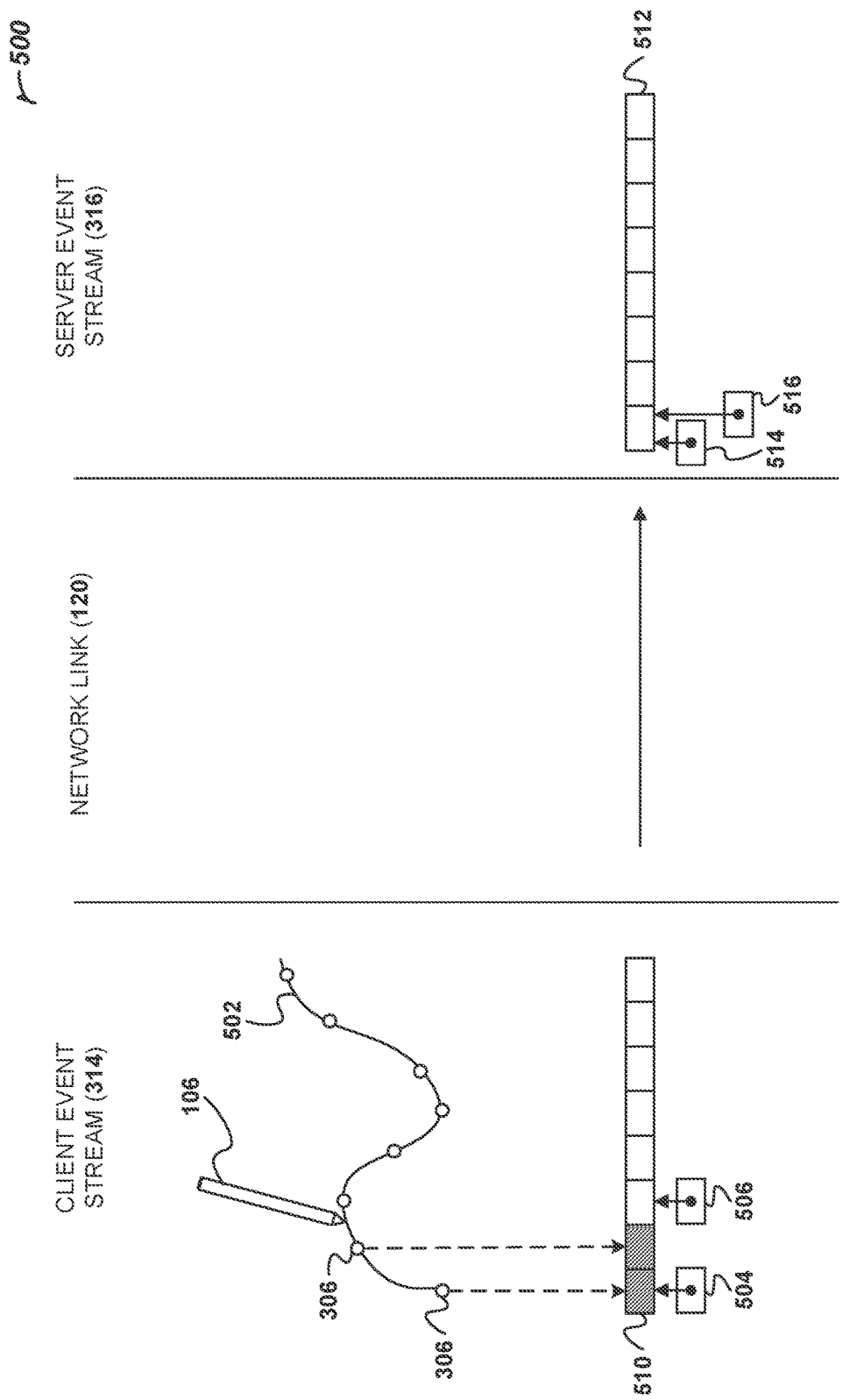
FIG. 5 illustrates a client event buffer being populated with input events generated by a stylus stroke, according to an embodiment.

FIG. 5 illustrates a client event buffer 510 being populated with input events generated by a stylus stroke 502, according to an embodiment. The client EventStream 314 and the server EventStream 316 may each include an "event buffer," 510, 512 which is a data structure for tracking input events 306. The event buffer 510, 512 may be a ring buffer, a circular queue, or any other data structure suitable for its purpose. If an event buffer 510, 512 is a ring buffer or a circular queue, the event buffer 510, 512 will have two pointers: a tail pointer 504, 514 and a head pointer 506, 516. The pseudocode below gives an example of the EventStream implemented in an object-oriented programming language, such as C++. Although the tail pointers 504, 514 and the head pointer 506, 516 may be implemented as actual pointers, in an embodiment, the tail pointers 504, 514 and the head pointer 506, 516 may be implemented as integers used to index the event buffer 510, 512.

```
class EventStream {
    int seqStart=0; // The lowest seq # for the stored events
    int length=0; // The number of events in eventsBuffer
    int capacity=1024; // Set to some fixed capacity
    EventStruct eventsBuffer[capacity];
    void addEvent(EventStruct*event) {
        int index=(seqStart+length) % capacity;
        eventsBuffer[index]=*event;
        if (length <(capacity-1/*end sentinel*/)) {length++;
        }
        else {
            // stream beyond capacity, dropping old events
                seqStart++;
        }
    }
    void ackEvent(EventStruct*event) {
        int ack=event→header.identifier;
        if (ack <seqStart) {
            // Ack is stale, nothing to update return;
        }
        int maxAck=seqStart+length;
        if (ack >maxAck) {
            // Ack is from the future? Shouldn't happen, skip
                return;
        }
        length-=(ack-seqStart);
        seqStart=ack;
    }
};
```

Client EventStream 314

When a new input event 306 is produced on the client device 102, the client EventStream 314 adds the new input event 306 to the head of the client event buffer 510 (e.g., the space in the client event buffer 510 pointed to by head pointer 506). The tail pointer 504 points to the next input event 306 that is to be sent to the server EventStream 316. After the client EventStream 314 has sent an input event 306 to the server EventStream 316 and has received from the server EventStream 316 an acknowledgement of its receipt, the client EventStream 314 moves the tail pointer 504 forward past the sent input event 306.

In some examples, whenever an input event 306 is added to the client event buffer 510, the client EventStream 314 immediately packages up every unacknowledged input event 306 in the client event buffer 510 and sends all of them to the server EventStream 316. Sending all unacknowledged input events 306 in the client event buffer 510 every time a new input event 306 is added to the client event buffer 510 may cause some unacknowledged input events 306 to be sent multiple times. Despite this, because the size of each input event 306 is small and because the server EventStream 316 knows to how to recognize duplicate input events 306 having duplicate input events 306 allows the server EventStream 316 to recover quickly from packet loss.

Server EventStream 316

When the server EventStream 316 receives input events 306, the server EventStream 316 checks the server event buffer 512 to determine which input events 306 have already been "played back" by the event rendering engine 318. This may be done by comparing the identifier of a received input event 306 to the tail pointer 514 and head pointer 516 of the server event buffer 512. The following pseudocode snippet is an example of how the server EventStream 316 may prevent adding duplicate input events 306 to server event buffer 512:

```
// Calculate the largest identifier index in server event buffer
Range selfRange=MakeRange(seqStart, _length);
Integer selfMaxIndex=MaxRange(selfRange);
// Calculate largest identifier index in the received data
Range        dataRange=MakeRange(dataSequenceIndex,
    (eventsCount-1));
Integer dataMaxIndex=MaxRange(dataRange);
// seqStart is the start of the identifier nums in the server
    event buffer
if (seqStart >=dataMaxIndex) {
    // Nothing to do, no new data to add so return early return;
}
if (selfMaxIndex >=dataMaxIndex) {
    // Nothing to do, no new data to add so return early return;
}
// New data has been found! Copy new data into the server
    event buffer
```

In the code above, dataSequenceIndex is the number of the starting sequence that was in the most recent packet received by the server EventStream 316. Similarly seqStart is the starting sequence in the server event buffer.

Figure 6:
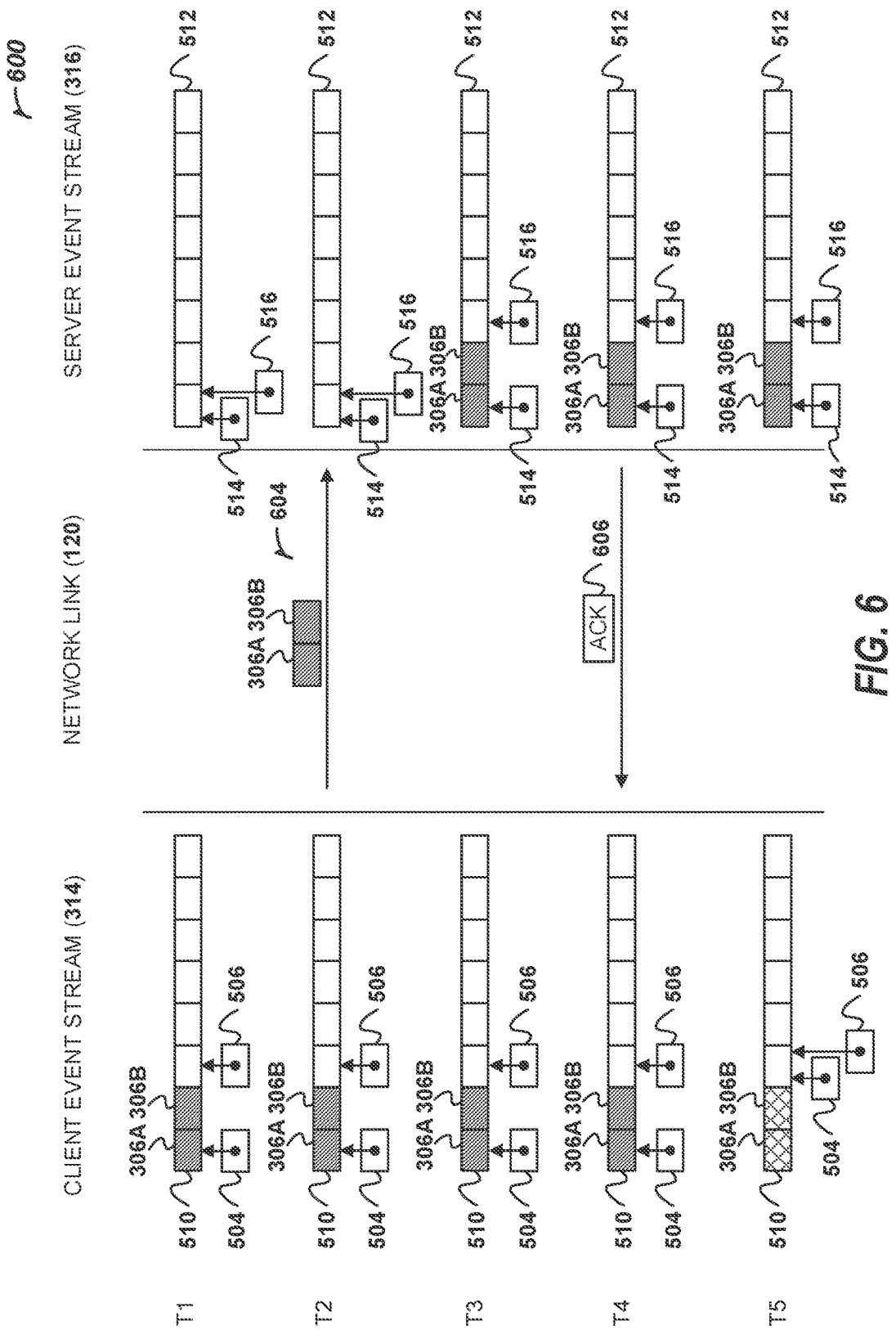
FIG. 6 illustrates states of event buffers resulting from communications between a client EventStream and a server EventStream, according to an embodiment.

FIG. 6 illustrates states of event buffers of client EventStream 314 and server EventStream 316 during event communications, according to an embodiment.

Acknowledging Received Input Events 306

At time T1, the client EventStream 314 receives input events 306A, 306B and places the input events 306A, 306B into the client event buffer 510. The head pointer 506 is advanced to the next empty slot of the client event buffer 510.

At time T2, the client EventStream 314 sends 604 the input events 306A, 306B to the server EventStream 316 over the network link 120.

At time T3, upon receiving an input event 306 from the client EventStream 314, the server EventStream 316 places the input events 306A, 306B into the server EventStream 316. The head pointer 516 is advanced to the next empty slot of the server event buffer 512.

At time T4, the server EventStream 316 sends an acknowledgement 606 to the client EventStream 314 over the network link 120. The acknowledgement 606 includes the identifier(s) for the input event(s) 306 being acknowledged.

At time T5, the client EventStream 314 receives the acknowledgement 606 from the server EventStream 316 and marks for removal the acknowledged input events 306A, 306B within the client event buffer 510. The tail pointer 504 is advanced to point to the slot of the client event buffer 510 that is just past the most recently acknowledged input event 306.

In an embodiment where input events 306 are assigned monotonically increasing identifiers, the server EventStream 316 may reduce the quantity of acknowledgements it sends to the client EventStream 314 by sending an acknowledgement for the received input event 306 having the highest identifier rather than sending an acknowledgement for each received input event 306. The tail pointer 504 is advanced to point to the slot of the client event buffer 510 that is just past the acknowledged input event 306 with the highest identifier.

Out of Order Events

The network communications protocol 320 used by the client EventStream 314 and the server EventStream 316 to communicate messages with each other may be a real-time (or near real-time) communications protocol, which does not guarantee in-order delivery of messages. Thus, an old input event 306 may not arrive at the server EventStream 316 until after the UI renderer 312 has processed the input event 306. If the server EventStream 316 were to naïvely process the old input event 306, the event rendering engine 318 might create a situation where the old input event 306 conflicts with a newer, already processed input event 306 (e.g., the input associated with the old input event 306 obscures or covers the input associated with the newer, already processed input event 306.) This problem may be mitigated by the same mechanism that is used to detect duplicate input events 306. When an input event 306 is received by the server EventStream 316, the server EventStream 316 compares the event identifier for the received input event 306 to the event identifier for the most recent input event 306 received by the server EventStream 316. If the event identifier for the received input event 306 is lower than the event identifier for the most recent input event 306, the server EventStream 316 considers the received input event 306 as already processed and drops the received input event 306 as if it was a duplicate input event 306.

Handling Packet Loss

Many of the input events 306 within client event buffer 510 are sent to the server EventStream 316 multiple times (e.g., each time an input event 306 is added to the client event buffer 510); thus, this redundancy increases the system's resilience to packet loss. However, packet loss may still occur, for example when the network link(s) 120 with poor network conditions (e.g., high latency, high jitter, or high packet loss).

Packet loss mitigation may be performed as follows. The event input manager 310 may keep track of the event identifier for input events 306 sent to the server EventStream 316 by client EventStream 314 (in some examples, all events). In some examples, the event input manager 310 only removes (or marks for removal) an input event 306 from the client event buffer 510 upon receiving a corresponding acknowledgement from the server EventStream 316. After a specified time, if the client EventStream 314 has not received a corresponding acknowledgement from the server EventStream 316 for a particular input event 306, the event input manager 310 marks the particular input event 306 as lost. When an input event 306 is marked as lost, in some examples, the client EventStream 314 resends to the server EventStream 316 all input events 306 within the client event buffer 510. This process is repeated until an acknowledgement is received for the particular input event 306.

UI Renderer 312

The UI renderer 312 renders the user interface on client device 102. Whenever the event input manager 310 receives a new input event 306, the event input manager 310 provides the UI renderer 312 with the new input event 306. The UI renderer 312 uses the coordinates (e.g., x and y of the EventPointStruct), the event type, and the acknowledgement status of the input event 306 to render the interim input and, if necessary, the unacknowledged input.

Figure 7:
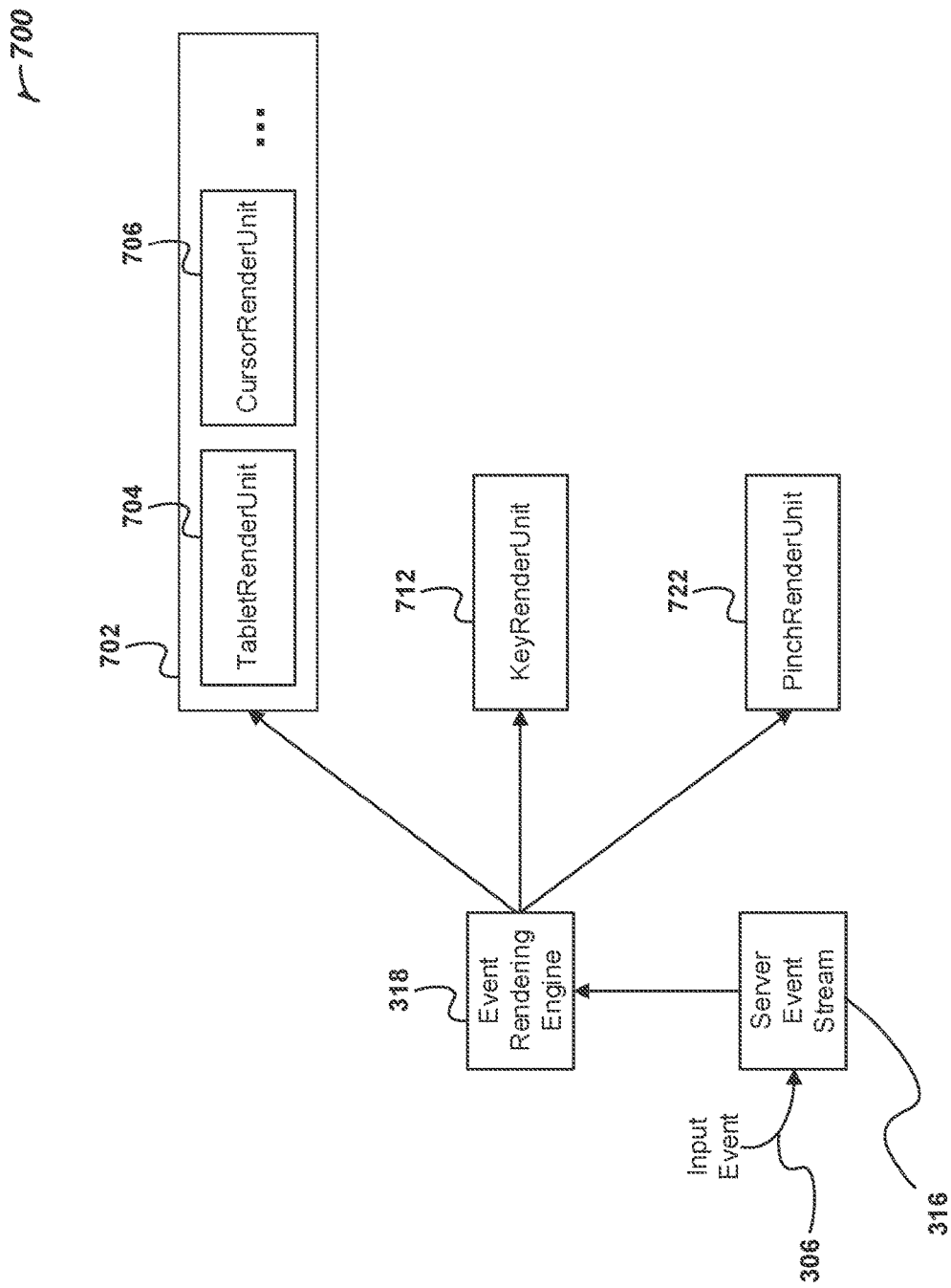
FIG. 7 the event rendering engine dispatching a received input event 306 to one or more render units, according to an embodiment.

FIG. 7 illustrates the event rendering engine 318 dispatching a received input event 306 to one or more render units 702, 704, 706, 712, 722, according to an embodiment. The event rendering engine 318, which executes within the server app 304 on server device 132, is responsible for dispatching a received input event 306 to one or more render units. A render unit is an abstract data type that accepts certain types of received input event 306 and simulates the input of a received input event 306 on the server device 132.

The event rendering engine 318 determines, based on the event type of the received input event 306, to which render unit(s) the received input event 306 should be sent. An event type may be associated with more than one render unit; in such cases, the received input event 306 is sent to each render unit associated with the event type of the received input event 306.

A render unit registers with the event rendering engine 318 the event type(s), for which the render unit should be sent received input events 306. For example, the Tablet Render Unit 704 registers with the event rendering engine 318 the event types EventStrokeBegin, EventStrokePoint, and EventStrokeEnd. Another example, is the Key Render Unit 712 registers with the event rendering engine 318 the event type EventKeyPressed.

Although much of the current disclosure uses example embodiments related to drawing, the system is not limited to drawing events. This system may be used to deliver any kind of user interaction data that must be delivered to another device in real-time (or near real-time). For example, when a user simulates a key press on a client device 102 by pressing a virtual button, the resulting input event 306 is created with an EventKeyPressed event type. Events may also be created for pinching to zoom on a canvas, panning the canvas, using an eraser on the canvas, etc.

Predictive Input

Some input devices 106 attempt to reduce latency by attempting to predict what the user's next input is going to be. Although these "predicted inputs" cannot be sent to the server app 304 for rendering in the spatial input software because the "predicted inputs" may be incorrect, the "predicted inputs" could be used to make the interim input on the client device 102 even more responsive.

When an input event handler 308 receives from input device 106 a predicted input event 306, the input event handler 308 passes the predicted input event 306 to the event input manager 310. The event input manager 310 passes the predicted input event 306 to the UI renderer 312, which uses the predicted input event 306 to update the interim input on the client display 104. However, the event input manager 310 does not pass the predicted input event 306 to the client EventStream 314 unless and until the predicted input event 306 is confirmed to be correct (e.g., by receiving an actual input event 306 that sufficiently corresponds to the predicted input event 306).

Appearance of Interim Input and Unacknowledged Input

The interim input or the unacknowledged input may be rendered with various colors, sizes, shapes, effects, textures, opacities, etc. To hide network latency, the client app 302 may match the appearance of the interim input or the unacknowledged input to the appearance of the regular input (e.g., matching the regular input's color/size/shape/effect/texture/opacity/etc.). This would make the interim input (and possibly the unacknowledged input) indistinguishable from the regular input.

Auto Detect Interim Input Time/Length

The amount of time to display the interim input may be a specified value (e.g., 150 ms). The amount of time to display the interim input may be also be dynamically adjusted. For example, the latency of the network link 120 may be automatically detected and used to modify dynamically the amount of time to display the interim input (e.g., adjusting the amount of time to display the interim input to be directly proportional to the detected network latency). Dynamically adjusting/determining the appropriate interim input time would improve the user experience of the system and would reduce or eliminate the need for configuring an appropriate static interim input time.

Figure 8:
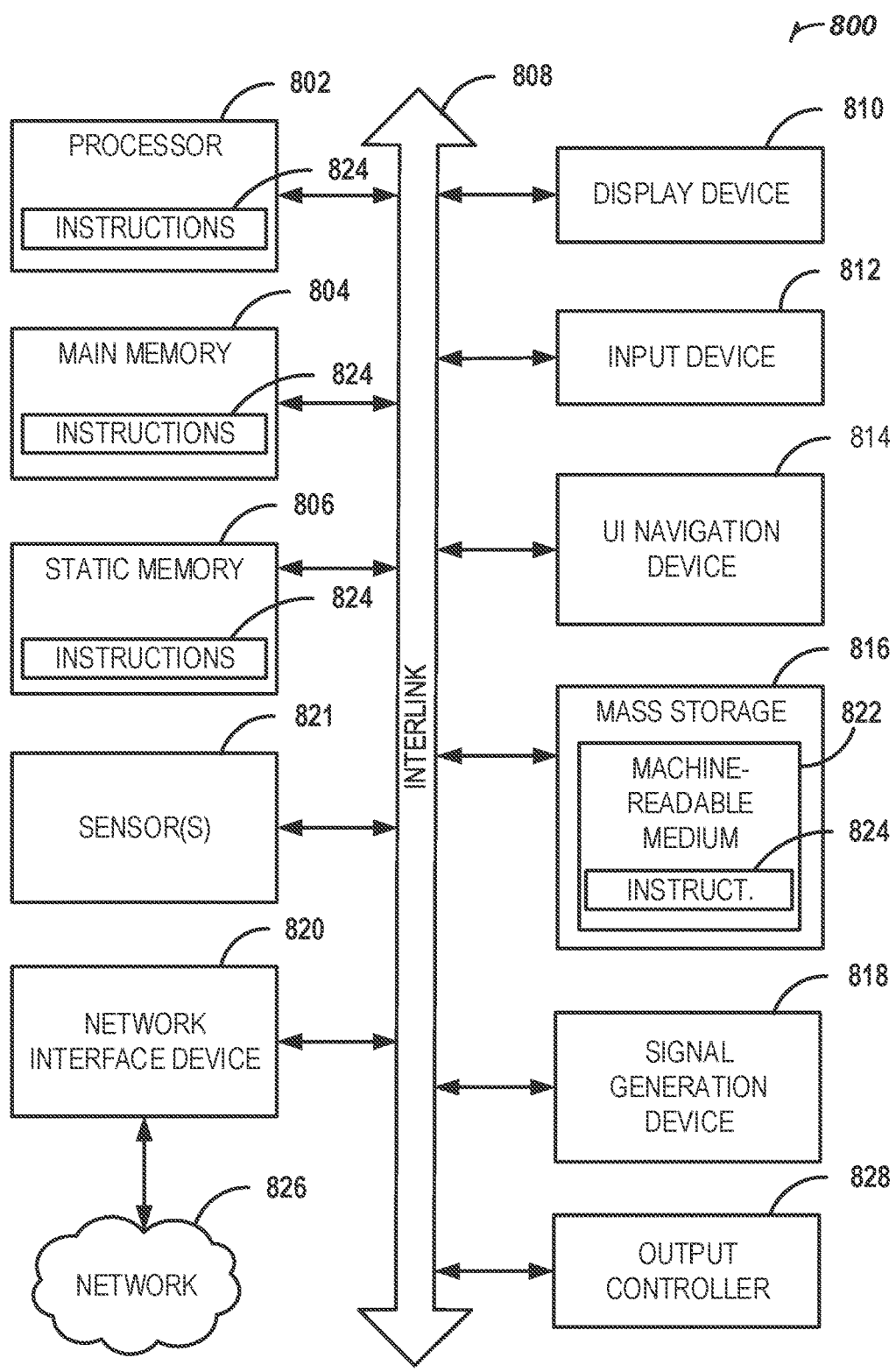
FIG. 8 is a block diagram illustrating an example of a machine, upon which any one or more embodiments may be implemented.

FIG. 8 is a block diagram illustrating an example of a machine 800, upon which any one or more embodiments may be implemented. In alternative embodiments, the machine 800 may operate as a standalone device or may be connected (e.g., networked) to other machines. In a networked deployment, the machine 800 may operate in the capacity of a server machine, a client machine, or both in a client-server network environment. In an example, the machine 800 may act as a peer machine in a peer-to-peer (P2P) (or other distributed) network environment. The machine 800 may implement or include any portion of the systems, devices, or methods illustrated in FIGS. 1-7 and 9-11, and may be a personal computer (PC), a tablet PC, a set-top box (STB), a personal digital assistant (PDA), a tablet, a mobile telephone, a smart phone, a web appliance, a network router, switch or bridge, or any machine capable of executing instructions (sequential or otherwise) that specify actions to be taken by that machine. Further, although only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations, etc.

Examples, as described herein, may include, or may operate by, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 800 may include a hardware processor 802 (e.g., a central processing unit (CPU), a graphics processing unit (GPU), a hardware processor core, or any combination thereof), a main memory 804 and a static memory 806, some or all of which may communicate with each other via an interlink (e.g., bus) 808.

The machine 800 may further include a display unit 810, an alphanumeric input device 812 (e.g., a keyboard), and a user interface (UI) navigation device 814 (e.g., a mouse, a pen/stylus, etc.). In an example, the display unit 810, input device 812 and UI navigation device 814 may be a touch screen display. The machine 800 may additionally include a storage device (e.g., drive unit) 816, a signal generation device 818 (e.g., a speaker), a network interface device 820, and one or more sensors 821, such as a global positioning system (GPS) sensor, compass, accelerometer, or other sensor. The machine 800 may include an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.)

The storage device 816 may include a machine-readable medium 822 on which is stored one or more sets of data structures or instructions 824 (e.g., software) embodying or utilized by any one or more of the techniques or functions described herein. The instructions 824 may also reside, completely or at least partially, within the main memory 804, within static memory 806, or within the hardware processor 802 during execution thereof by the machine 800. In an example, one or any combination of the hardware processor 802, the main memory 804, the static memory 806, or the storage device 816 may constitute machine-readable media.

Although the machine-readable medium 822 is illustrated as a single medium, the term "machine-readable medium" may include a single medium or multiple media (e.g., a centralized or distributed database, and/or associated caches and servers) configured to store the one or more instructions 824.

The term "machine-readable medium" may include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine-readable medium examples may include solid-state memories, and optical and magnetic media. Accordingly, machine-readable media are not transitory propagating signals. Specific examples of machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks.

The instructions 824 may further be transmitted or received over a communications network 826 using a transmission medium via the network interface device 820 utilizing any one of a number of transfer protocols (e.g., frame relay, internet protocol (IP), transmission control protocol (TCP), user datagram protocol (UDP), hypertext transfer protocol (HTTP), etc.). The term "transmission medium" shall be taken to include any intangible medium that is capable of storing, encoding or carrying instructions for execution by the machine 800, and includes digital or analog communications signals or other intangible medium to facilitate communication of such software.

Figure 9:
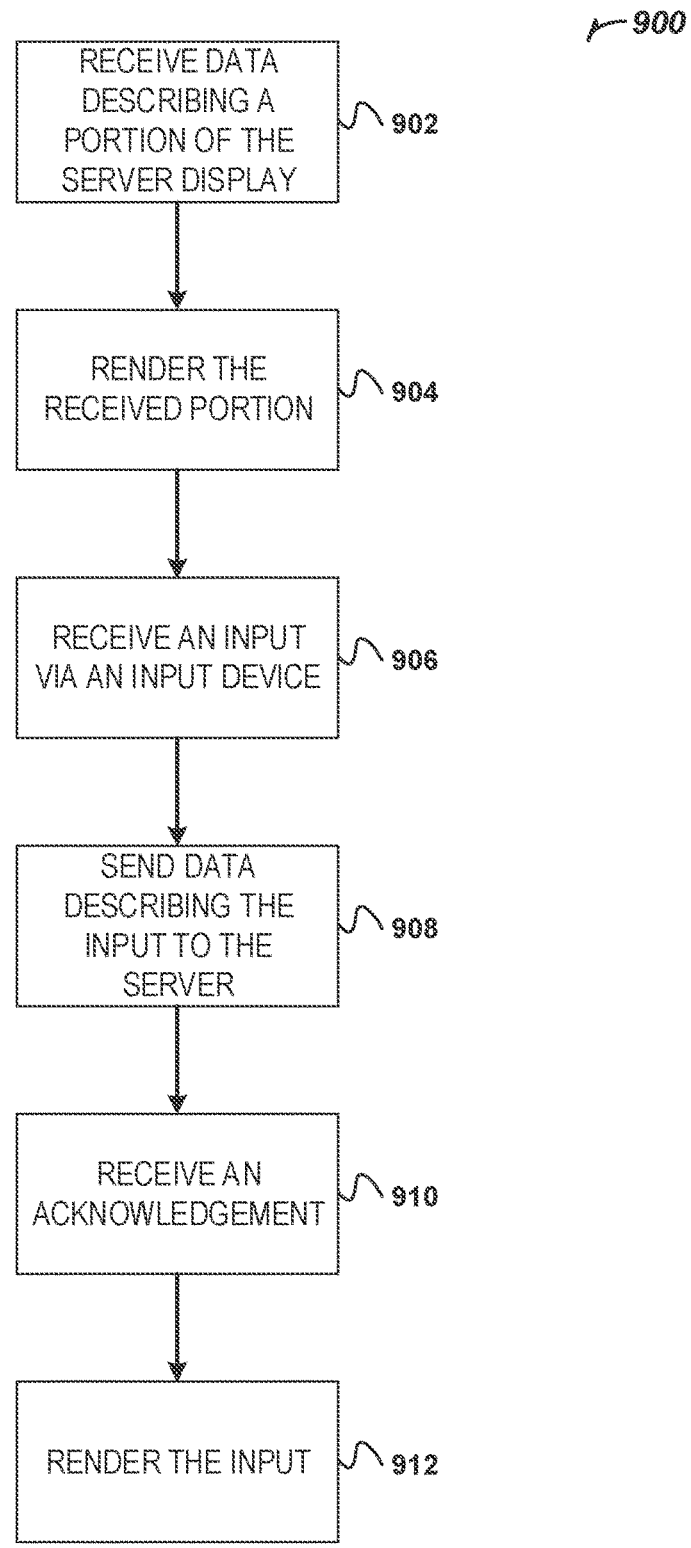
FIG. 9 shows an example method of a client device rendering input according to an embodiment.

Turning now to FIG. 9, an example method 900 of a client device rendering input is shown according to some examples of the present disclosure. At operation 902, the client device receives data describing a portion of the server display. For example, the client devices receives a frame sent by the server as one or more packets encoded by a video codec. As noted, this communication may occur over a network. This frame may describe a portion of the server's display that is a subset of the complete display. For example, server display 135 of FIG. 1, the portion sent may be the portion denoted by the dotted rectangle display portion 134 in FIG. 1.

At operation 904 the received portion of the server display may be rendered on the display of the client. Operations 902 and 904 may be performed repeatedly to obtain a video frame rate that is smooth and stutter free. For example, 30, 60, or other frames per second. At operation 906 an input may be received via an input device (such as a touchscreen from a touch screen display) on the client. The input may include one or more data points that describe one or more properties of the input (such as coordinates of the input). At operation 908 data describing the input is sent to the server device. In some examples, at this point, the input may be rendered on the display of the client device in a first manner. At operation 910 the client device receives an acknowledgement from the server device. At operation 912 the input may be rendered. In some examples, the input may be rendered in a manner that distinguishes it from input that is consumed by the server. If the input was already rendered in a first manner prior to being acknowledged, the input may be re-rendered in a second manner distinct from the first manner. Once the input is considered consumed by the server (in some examples after a determined waiting period expires) the input may cease to be rendered by the client application (as the server application would have consumed the input and rendered it there, which would reflect on the client).

Figure 10:
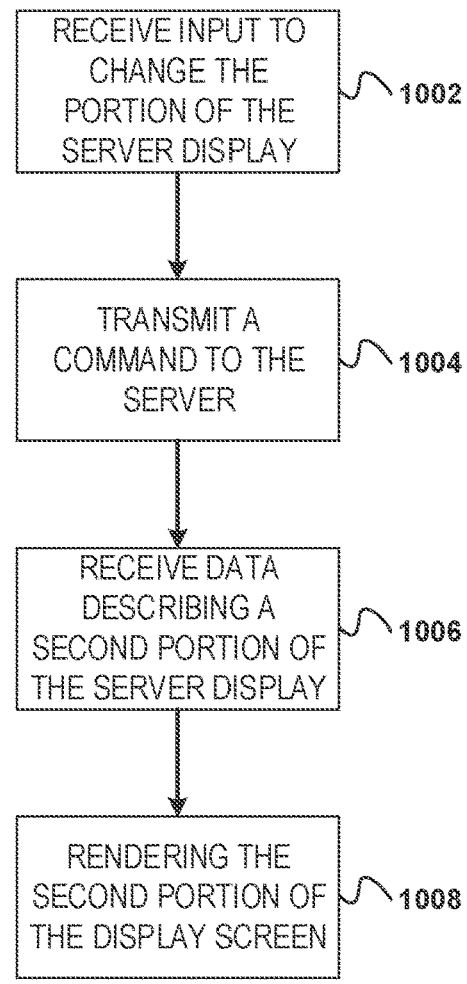
FIG. 10 shows an example method of changing the portion of the server display that is displayed on the client device according to an embodiment.

Turning now to FIG. 10, a method 1000 of changing the portion of the server display that is displayed on the client device is shown according to some examples of the present disclosure. At operation 1002, the client device may receive an input from the user that the user wishes to change the portion of the server display displayed by the client. This input may be directed to a graphical user interface (GUI) element on the client device, such as shown in FIG. 1B. For example, the navigator 150 of FIG. 1B may be overlaid over the currently shown display of the server. At operation 1004 a command to change the portion of the server display may be sent to the server. This command may include data identifying the new display coordinates or data identifying changes in the displayed portions (e.g., delta-x and delta-y coordinates). At operation 1006, the client device may receive data describing the second portion of the server display. The first and second portions may be smaller portions than a complete portion of the server display. At operation 1008, the second portion may be rendered to the display screen of the client device.

Figure 11:
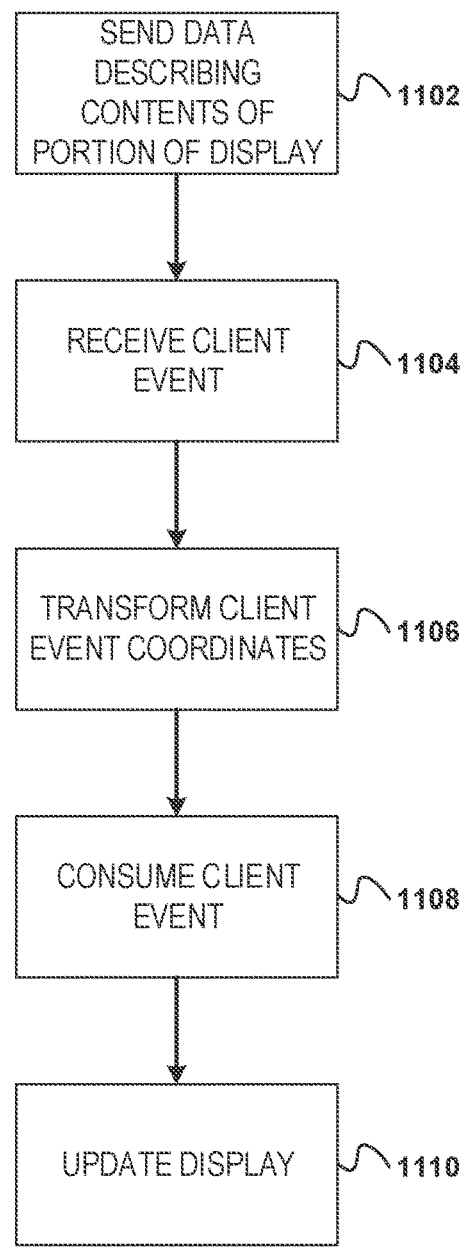
FIG. 11 shows a method of a server processing an input event sent from a client device according to an embodiment.

Turning now to FIG. 11, a method 1100 of a server processing an input event sent from a client device is shown according to some examples. At operation 1102 the server sends the client a portion of the server display. This portion may be selected by the client on the client device. The server may encode and packetize the portion of the display buffer of interest and send it to the client device. In some examples, this may be done continuously, or quasi-continuously to ensure a high frame rate (e.g., 30, 60 fps). At operation 1104 a client event is received. Data describing the client event, such as coordinates, may be included in the event. At operation 1106, the coordinates in the event sent by the client may be converted to coordinates of the server display. This may be done as previously described by utilizing the ratio of the client display size to the selected display portion. At operation 1108 the client event may be consumed—for example, as a local input would be consumed. This may include rendering the event. At operation 1110 an updated display may be sent to the client. As noted previously, the communications between the server and client may take place over one or more networks.

ADDITIONAL NOTES & EXAMPLE EMBODIMENTS

Conventional terms in the fields of computer networking and computer systems have been used herein. The terms are known in the art and are provided only as a non-limiting example for convenience purposes. Accordingly, the interpretation of the corresponding terms in the claims, unless stated otherwise, is not limited to any particular definition.

Although specific embodiments have been illustrated and described herein, it will be appreciated by those of ordinary skill in the art that any arrangement that is calculated to achieve the same purpose may be substituted for the specific embodiments shown. Many adaptations will be apparent to those of ordinary skill in the art. Accordingly, this application is intended to cover any adaptations or variations.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. Moreover, in the following claims, the terms "first," "second," and "third," etc. are used merely as labels, and are not intended to impose numerical requirements on their objects.

In this Detailed Description, various features may have been grouped together to streamline the disclosure. This should not be interpreted as intending that an unclaimed disclosed feature is essential to any claim. Rather, inventive subject matter may lie in less than all features of a particular disclosed embodiment.

The above description is intended to be illustrative, and not restrictive. For example, the above-described examples (or one or more aspects thereof) may be used in combination with each other. Other embodiments may be used, such as by one of ordinary skill in the art upon reviewing the above description.

OTHER NOTES AND EXAMPLES

Example 1 is a computing device comprising: a display screen; an input device; a processor; a memory coupled to the processor and comprising instructions, when performed by the processor, causes the computing device to perform operations comprising: receiving from a server device, data describing a portion of a graphical display of the server device; rendering the portion of the graphical display of the server device on the display screen using the received data; receiving an input via the input device; sending data describing the input to the server device, the server device processing the input from the input device of the computing device as local input on the server device; receiving an acknowledgement from the server device that the data describing the input was received; and responsive to the acknowledgement from the server device, rendering the input by the processor over the portion of the graphical display of the server device displayed on the display screen at a position of the input.

In Example 2, the subject matter of Example 1 optionally includes wherein the operations comprise: ceasing to render the input over the portion of the graphical display of the server displayed on the display screen when a determination is made that the server device has consumed the input.

In Example 3, the subject matter of Example 2 optionally includes wherein the operations of ceasing to render the input over the portion of the graphical display of the server displayed on the display screen when a determination is made that the server device has consumed the input comprises: waiting a predetermined period of time; and upon conclusion of the predetermined period of time, determining that the server device has consumed the input; and in response, ceasing to render the input over the portion of the graphical display of the server displayed on the display screen.

In Example 4, the subject matter of Example 3 optionally includes wherein the operations comprise: receiving from the server device, second data describing the portion of the graphical display on the server device; and rendering the portion of the graphical display of the server device on the display screen using the received second data, the rendered portion of the graphical display of the server device including a visual representation of the input that is visible after ceasing to render the input over the portion of the graphical display.

In Example 5, the subject matter of any one or more of Examples 1-4 optionally include wherein the operations comprise: determining characteristics of the input by determining how previously consumed inputs near the position of the input were displayed by examining the received data describing the portion of the graphical display of the server device; and wherein rendering the input by the processor over the portion of the graphical display of the server device displayed on the display screen at the position of the input comprises rendering the input using the determined characteristics.

In Example 6, the subject matter of any one or more of Examples 1-5 optionally include wherein the operations comprise: prior to a receipt of an acknowledgement from the server device that the data describing the input was received, rendering, in a first manner, the input by the processor over the portion of the graphical display of the server device displayed on the display screen at the position of the input; receiving an acknowledgement from the server device that the data describing the input was received; responsive to receipt of the acknowledgement from the server device, re-rendering in a second manner, the input by the processor over the portion of the graphical display of the server device displayed on the display screen at the position of the input; and responsive to a determination that the server device has consumed the input, ceasing to render the input over the portion of the graphical display, the first and second manners being visually distinct.

In Example 7, the subject matter of any one or more of Examples 1-6 optionally include wherein the operations comprise: receiving an input via the input device to change the portion of the graphical display received from the server device to a second portion; receiving from the server device second data describing the second portion of the graphical display of the server device, the second portion being different than the portion; and rendering the second portion of the graphical display of the server device on the display screen using the second received data.

In Example 8, the subject matter of Example 7 optionally includes wherein the input to change the portion of the graphical display received from the server device to the second portion comprises an input directed to a navigation display selecting the second portion.

In Example 9, the subject matter of Example 8 optionally includes wherein the operations comprise: sending a command to the server device to change to the second portion, the command comprises a delta x and a delta y value describing a difference between the portion and the second portion.

In Example 10, the subject matter of any one or more of Examples 8-9 optionally include wherein the navigation display is overlaid on top of the rendered received portion of the graphical display of the server device on the display screen.

Example 11 is a method comprising: using a processor: receiving from a server device, data describing a portion of a graphical display of the server device; rendering the portion of the graphical display of the server device on a display screen using the received data; receiving an input via an input device; sending data describing the input to the server device, the server device processing the input from the input device as local input on the server device; receiving an acknowledgement from the server device that the data describing the input was received; and responsive to the acknowledgement from the server device, rendering the input by the processor over the portion of the graphical display of the server device displayed on the display screen at a position of the input.

In Example 12, the subject matter of Example 11 optionally includes ceasing to render the input over the portion of the graphical display of the server displayed on the display screen when a determination is made that the server device has consumed the input.

In Example 13, the subject matter of Example 12 optionally includes wherein ceasing to render the input over the portion of the graphical display of the server displayed on the display screen when a determination is made that the server device has consumed the input comprises: waiting a predetermined period of time; and upon conclusion of the predetermined period of time, determining that the server device has consumed the input; and in response, ceasing to render the input over the portion of the graphical display of the server displayed on the display screen.

In Example 14, the subject matter of Example 13 optionally includes receiving from the server device, second data describing the portion of the graphical display on the server device; and rendering the portion of the graphical display of the server device on the display screen using the received second data, the rendered portion of the graphical display of the server device including a visual representation of the input that is visible after ceasing to render the input over the portion of the graphical display.

In Example 15, the subject matter of any one or more of Examples 11-14 optionally include determining characteristics of the input by determining how previously consumed inputs near the position of the input were displayed by examining the received data describing the portion of the graphical display of the server device; and wherein rendering the input by the processor over the portion of the graphical display of the server device displayed on the display screen at the position of the input comprises rendering the input using the determined characteristics.

In Example 16, the subject matter of any one or more of Examples 11-15 optionally include prior to a receipt of an acknowledgement from the server device that the data describing the input was received, rendering, in a first manner, the input by the processor over the portion of the graphical display of the server device displayed on the display screen at the position of the input; receiving an acknowledgement from the server device that the data describing the input was received; responsive to receipt of the acknowledgement from the server device, re-rendering in a second manner, the input by the processor over the portion of the graphical display of the server device displayed on the display screen at the position of the input; and responsive to a determination that the server device has consumed the input, ceasing to render the input over the portion of the graphical display, the first and second manners being visually distinct.

In Example 17, the subject matter of any one or more of Examples 11-16 optionally include wherein the method further comprises: receiving an input via the input device to change the portion of the graphical display received from the server device to a second portion; receiving from the server device second data describing the second portion of the graphical display of the server device, the second portion being different than the portion; and rendering the second portion of the graphical display of the server device on the display screen using the second received data.

In Example 18, the subject matter of Example 17 optionally includes wherein the input to change the portion of the graphical display received from the server device to the second portion comprises an input directed to a navigation display selecting the second portion.

In Example 19, the subject matter of Example 18 optionally includes wherein the method further comprises: sending a command to the server device to change to the second portion, the command comprises a delta x and a delta y value describing a difference between the portion and the second portion.

In Example 20, the subject matter of any one or more of Examples 18-19 optionally include wherein the navigation display is overlaid on top of the rendered received portion of the graphical display of the server device on the display screen.

Example 21 is a machine-readable medium, comprising instructions, which when performed by a machine, causes the machine to perform operations comprising: receiving from a server device, data describing a portion of a graphical display of the server device; rendering the portion of the graphical display of the server device on a display screen using the received data; receiving an input via an input device; sending data describing the input to the server device, the server device processing the input from the input device of the computing device as local input on the server device; receiving an acknowledgement from the server device that the data describing the input was received; and responsive to the acknowledgement from the server device, rendering the input by the processor over the portion of the graphical display of the server device displayed on the display screen at a position of the input.

In Example 22, the subject matter of Example 21 optionally includes wherein the operations comprise: ceasing to render the input over the portion of the graphical display of the server displayed on the display screen when a determination is made that the server device has consumed the input.

In Example 23, the subject matter of Example 22 optionally includes wherein the operations of ceasing to render the input over the portion of the graphical display of the server displayed on the display screen when a determination is made that the server device has consumed the input comprises: waiting a predetermined period of time; and upon conclusion of the predetermined period of time, determining that the server device has consumed the input; and in response, ceasing to render the input over the portion of the graphical display of the server displayed on the display screen.

In Example 24, the subject matter of Example 23 optionally includes wherein the operations comprise: receiving from the server device, second data describing the portion of the graphical display on the server device; and rendering the portion of the graphical display of the server device on the display screen using the received second data, the rendered portion of the graphical display of the server device including a visual representation of the input that is visible after ceasing to render the input over the portion of the graphical display.

In Example 25, the subject matter of any one or more of Examples 21-24 optionally include wherein the operations comprise: determining characteristics of the input by determining how previously consumed inputs near the position of the input were displayed by examining the received data describing the portion of the graphical display of the server device; and wherein rendering the input by the processor over the portion of the graphical display of the server device displayed on the display screen at the position of the input comprises rendering the input using the determined characteristics.

In Example 26, the subject matter of any one or more of Examples 21-25 optionally include wherein the operations comprise: prior to a receipt of an acknowledgement from the server device that the data describing the input was received, rendering, in a first manner, the input by the processor over the portion of the graphical display of the server device displayed on the display screen at the position of the input; receiving an acknowledgement from the server device that the data describing the input was received; responsive to receipt of the acknowledgement from the server device, re-rendering in a second manner, the input by the processor over the portion of the graphical display of the server device displayed on the display screen at the position of the input; and responsive to a determination that the server device has consumed the input, ceasing to render the input over the portion of the graphical display, the first and second manners being visually distinct.

In Example 27, the subject matter of any one or more of Examples 21-26 optionally include wherein the operations comprise: receiving an input via the input device to change the portion of the graphical display received from the server device to a second portion; receiving from the server device second data describing the second portion of the graphical display of the server device, the second portion being different than the portion; and rendering the second portion of the graphical display of the server device on the display screen using the second received data.

In Example 28, the subject matter of Example 27 optionally includes wherein the input to change the portion of the graphical display received from the server device to the second portion comprises an input directed to a navigation display selecting the second portion.

In Example 29, the subject matter of Example 28 optionally includes wherein the operations comprise: sending a command to the server device to change to the second portion, the command comprises a delta x and a delta y value describing a difference between the portion and the second portion.

In Example 30, the subject matter of any one or more of Examples 28-29 optionally include wherein the navigation display is overlaid on top of the rendered received portion of the graphical display of the server device on the display screen.

Example 31 is a computing device comprising: a display screen; an input device; a processor; a memory coupled to the processor and comprising instructions, when performed by the processor, causes the computing device to perform operations comprising: receiving from a server device, data describing a first portion of a graphical display on the server device, the first portion being less than a complete graphical display on the server device; rendering the first portion of the graphical display of the server device on the display screen using the received data describing the first portion; receiving an input via the input device; sending data describing the input to the server device, the server device processing the input from the input device of the computing device as local input on the server device; receiving an input via the input device from a graphical user interface (GUI) element displayed on the display screen to change the first portion of the graphical display received from the server device to a second portion; transmitting a command to the server device to change the first portion of the graphical display received from the server device to the second portion; receiving from the server device second data describing the second portion of the graphical display of the server device, the second portion being less than the complete graphical display on the server device and being different than the first portion; and rendering the second portion of the graphical display of the server device on the display screen using the received second data.

In Example 32, the subject matter of Example 31 optionally includes wherein the operations further comprise: receiving an acknowledgement from the server device that the data describing the input was received; and responsive to the acknowledgement from the server device, rendering the input by the processor over the first portion of the graphical display of the server device displayed on the display screen at a position of the input.

In Example 33, the subject matter of Example 32 optionally includes wherein the operations comprise: ceasing to render the input over the first portion of the graphical display of the server displayed on the display screen when a determination is made that the server device has consumed the input.

In Example 34, the subject matter of Example 33 optionally includes wherein the operations of ceasing to render the input over the first portion of the graphical display of the server displayed on the display screen when a determination is made that the server device has consumed the input comprises: waiting a predetermined period of time; and upon conclusion of the predetermined period of time, determining that the server device has consumed the input; and in response, ceasing to render the input over the first portion of the graphical display of the server displayed on the display screen.

In Example 35, the subject matter of Example 34 optionally includes wherein the operations comprise: receiving from the server device, second data describing the first portion of the graphical display on the server device; and rendering the first portion of the graphical display of the server device on the display screen using the received second data, the rendered first portion of the graphical display of the server device including a visual representation of the input that is visible after ceasing to render the input over the first portion of the graphical display.

In Example 36, the subject matter of any one or more of Examples 31-35 optionally include wherein the operations comprise: determining characteristics of the input by determining how previously consumed inputs near the coordinates of the input were displayed by examining the received data describing the first portion of the graphical display of the server device; and wherein rendering the input by the processor over the first portion of the graphical display of the server device displayed on the display screen at the position of the input comprises rendering the input using the determined characteristics.

In Example 37, the subject matter of any one or more of Examples 31-36 optionally include wherein the operations comprise: prior to a receipt of an acknowledgement from the server device that the data describing the input was received, rendering, in a first manner, the input by the processor over the first portion of the graphical display of the server device displayed on the display screen at the position of the input; receiving an acknowledgement from the server device that the data describing the input was received; responsive to receipt of the acknowledgement from the server device, re-rendering in a second manner, the input by the processor over the first portion of the graphical display of the server device displayed on the display screen at the position of the input; and responsive to a determination that the server device has consumed the input, ceasing to render the input over the first portion of the graphical display, the first and second manners being visually distinct.

In Example 38, the subject matter of any one or more of Examples 31-37 optionally include wherein the operations comprise: wherein the GUI element comprises a navigation display showing a smaller version of the complete graphical display on the server device and an indication of the first portion of the graphical display on the server device in relation to the complete graphical display on the server device; and wherein the input to change the first portion of the graphical display received from the server device to the second portion comprises an input directed to the navigation display selecting the second portion.

In Example 39, the subject matter of Example 38 optionally includes wherein the command transmitted to the server device comprises a delta x and a delta y value describing a difference between the portion and the second portion.

In Example 40, the subject matter of any one or more of Examples 38-39 optionally include wherein the navigation display is overlaid on top of the rendered received portion of the graphical display of the server device on the display screen.

Example 41 is a method comprising: receiving from a server device, data describing a first portion of a graphical display on the server device, the first portion being less than a complete graphical display on the server device; rendering the first portion of the graphical display of the server device on a display screen using the received data describing the first portion; receiving an input via an input device; sending data describing the input to the server device, the server device processing the input from the input device of the computing device as local input on the server device; receiving an input via the input device from a graphical user interface (GUI) element displayed on the display screen to change the first portion of the graphical display received from the server device to a second portion; transmitting a command to the server device to change the first portion of the graphical display received from the server device to the second portion; receiving from the server device second data describing the second portion of the graphical display of the server device, the second portion being less than the complete graphical display on the server device and being different than the first portion; and rendering the second portion of the graphical display of the server device on the display screen using the received second data.

In Example 42, the subject matter of Example 41 optionally includes receiving an acknowledgement from the server device that the data describing the input was received; and responsive to the acknowledgement from the server device, rendering the input by the processor over the first portion of the graphical display of the server device displayed on the display screen at a position of the input.

In Example 43, the subject matter of Example 42 optionally includes ceasing to render the input over the first portion of the graphical display of the server displayed on the display screen when a determination is made that the server device has consumed the input.

In Example 44, the subject matter of Example 43 optionally includes wherein ceasing to render the input over the first portion of the graphical display of the server displayed on the display screen when a determination is made that the server device has consumed the input comprises: waiting a predetermined period of time; and upon conclusion of the predetermined period of time, determining that the server device has consumed the input; and in response, ceasing to render the input over the first portion of the graphical display of the server displayed on the display screen.

In Example 45, the subject matter of Example 44 optionally includes receiving from the server device, second data describing the first portion of the graphical display on the server device; and rendering the first portion of the graphical display of the server device on the display screen using the received second data, the rendered first portion of the graphical display of the server device including a visual representation of the input that is visible after ceasing to render the input over the first portion of the graphical display.

In Example 46, the subject matter of any one or more of Examples 41-45 optionally include determining characteristics of the input by determining how previously consumed inputs near the coordinates of the input were displayed by examining the received data describing the first portion of the graphical display of the server device; and wherein rendering the input by the processor over the first portion of the graphical display of the server device displayed on the display screen at the position of the input comprises rendering the input using the determined characteristics.

In Example 47, the subject matter of any one or more of Examples 41-46 optionally include prior to a receipt of an acknowledgement from the server device that the data describing the input was received, rendering, in a first manner, the input by the processor over the first portion of the graphical display of the server device displayed on the display screen at the position of the input; receiving an acknowledgement from the server device that the data describing the input was received; responsive to receipt of the acknowledgement from the server device, re-rendering in a second manner, the input by the processor over the first portion of the graphical display of the server device displayed on the display screen at the position of the input; and responsive to a determination that the server device has consumed the input, ceasing to render the input over the first portion of the graphical display, the first and second manners being visually distinct.

In Example 48, the subject matter of any one or more of Examples 41-47 optionally include wherein the GUI element comprises a navigation display showing a smaller version of the complete graphical display on the server device and an indication of the first portion of the graphical display on the server device in relation to the complete graphical display on the server device; and wherein the input to change the first portion of the graphical display received from the server device to the second portion comprises an input directed to the navigation display selecting the second portion.

In Example 49, the subject matter of Example 48 optionally includes wherein the command transmitted to the server device comprises a delta x and a delta y value describing a difference between the portion and the second portion.

In Example 50, the subject matter of any one or more of Examples 48-49 optionally include wherein the navigation display is overlaid on top of the rendered received portion of the graphical display of the server device on the display screen.

Example 51 is a machine-readable medium, comprising instructions, which when performed by a machine, causes the machine to perform operations comprising: receiving from a server device, data describing a first portion of a graphical display on the server device, the first portion being less than a complete graphical display on the server device; rendering the first portion of the graphical display of the server device on a display screen using the received data describing the first portion; receiving an input via an input device; sending data describing the input to the server device, the server device processing the input from the input device of the computing device as local input on the server device; receiving an input via the input device from a graphical user interface (GUI) element displayed on the display screen to change the first portion of the graphical display received from the server device to a second portion; transmitting a command to the server device to change the first portion of the graphical display received from the server device to the second portion; receiving from the server device second data describing the second portion of the graphical display of the server device, the second portion being less than the complete graphical display on the server device and being different than the first portion; and rendering the second portion of the graphical display of the server device on the display screen using the received second data.

In Example 52, the subject matter of Example 51 optionally includes wherein the operations further comprise: receiving an acknowledgement from the server device that the data describing the input was received; and responsive to the acknowledgement from the server device, rendering the input by the processor over the first portion of the graphical display of the server device displayed on the display screen at a position of the input.

In Example 53, the subject matter of Example 52 optionally includes wherein the operations comprise: ceasing to render the input over the first portion of the graphical display of the server displayed on the display screen when a determination is made that the server device has consumed the input.

In Example 54, the subject matter of Example 53 optionally includes wherein the operations of ceasing to render the input over the first portion of the graphical display of the server displayed on the display screen when a determination is made that the server device has consumed the input comprises: waiting a predetermined period of time; and upon conclusion of the predetermined period of time, determining that the server device has consumed the input; and in response, ceasing to render the input over the first portion of the graphical display of the server displayed on the display screen.

In Example 55, the subject matter of Example 54 optionally includes wherein the operations comprise: receiving from the server device, second data describing the first portion of the graphical display on the server device; and rendering the first portion of the graphical display of the server device on the display screen using the received second data, the rendered first portion of the graphical display of the server device including a visual representation of the input that is visible after ceasing to render the input over the first portion of the graphical display.

In Example 56, the subject matter of any one or more of Examples 51-55 optionally include wherein the operations comprise: determining characteristics of the input by determining how previously consumed inputs near the coordinates of the input were displayed by examining the received data describing the first portion of the graphical display of the server device; and wherein rendering the input by the processor over the first portion of the graphical display of the server device displayed on the display screen at the position of the input comprises rendering the input using the determined characteristics.

In Example 57, the subject matter of any one or more of Examples 51-56 optionally include wherein the operations comprise: prior to a receipt of an acknowledgement from the server device that the data describing the input was received, rendering, in a first manner, the input by the processor over the first portion of the graphical display of the server device displayed on the display screen at the position of the input; receiving an acknowledgement from the server device that the data describing the input was received; responsive to receipt of the acknowledgement from the server device, re-rendering in a second manner, the input by the processor over the first portion of the graphical display of the server device displayed on the display screen at the position of the input; and responsive to a determination that the server device has consumed the input, ceasing to render the input over the first portion of the graphical display, the first and second manners being visually distinct.

In Example 58, the subject matter of any one or more of Examples 51-57 optionally include wherein the operations comprise: wherein the GUI element comprises a navigation display showing a smaller version of the complete graphical display on the server device and an indication of the first portion of the graphical display on the server device in relation to the complete graphical display on the server device; and wherein the input to change the first portion of the graphical display received from the server device to the second portion comprises an input directed to the navigation display selecting the second portion.

In Example 59, the subject matter of Example 58 optionally includes wherein the command transmitted to the server device comprises a delta x and a delta y value describing a difference between the portion and the second portion.

In Example 60, the subject matter of any one or more of Examples 58-59 optionally include wherein the navigation display is overlaid on top of the rendered received portion of the graphical display of the server device on the display screen.

Example 61 is a computing device comprising: a display screen; a processor; a memory coupled to the processor and including instructions, when performed by the processor, causes the computing device to perform operations comprising: sending data describing contents of a defined portion of a graphical display of the display screen to a client device over a network; receiving information on a user-initiated input event from the client device; modifying client space coordinates in the received information to server space coordinates based upon a size of the defined portion; consuming the modified information on the user-initiated input event as if it were an input generated locally; updating the display screen based upon the modified information; and sending data describing contents of the defined portion of the updated graphical display of the display screen to the client device over a network.

In Example 62, the subject matter of Example 61 optionally includes wherein the operations further comprise: sending an acknowledgement to the client responsive to receiving the information on a user-initiated input event from the client device.

In Example 63, the subject matter of any one or more of Examples 61-62 optionally include wherein the operations further comprise: encoding the data describing contents of the defined portion of the graphical display of the display screen to the client device over the network using a video codec.

In Example 64, the subject matter of any one or more of Examples 61-63 optionally include wherein the operations further comprise: receiving a change in the defined portion of the graphical display of the display screen to a second defined portion; and sending data describing contents of the second defined portion of the graphical display of the display screen to the client device over the network.

In Example 65, the subject matter of any one or more of Examples 61-64 optionally include wherein the operations further comprise: storing the received information on the user-initiated input event in an event queue; and prior to consuming the modified information on the user-initiated input event, determining that a largest sequence number of events in the event queue is less than a sequence in the information on the user-initiated input event.

In Example 66, the subject matter of any one or more of Examples 61-65 optionally include wherein the operations further comprise: sending a thumbnail representation of the entire graphical display of the display screen to the client device over the network.

Example 67 is a method comprising: sending data describing contents of a defined portion of a graphical display of a display screen to a client device over a network; receiving information on a user-initiated input event from the client device; modifying client space coordinates in the received information to server space coordinates based upon a size of the defined portion; consuming the modified information on the user-initiated input event as if it were an input generated locally; updating the display screen based upon the modified information; and sending data describing contents of the defined portion of the updated graphical display of the display screen to the client device over a network.

In Example 68, the subject matter of Example 67 optionally includes wherein the operations further comprise: sending an acknowledgement to the client responsive to receiving the information on a user-initiated input event from the client device.

In Example 69, the subject matter of any one or more of Examples 67-68 optionally include wherein the operations further comprise: encoding the data describing contents of the defined portion of the graphical display of the display screen to the client device over the network using a video codec.

In Example 70, the subject matter of any one or more of Examples 67-69 optionally include wherein the operations further comprise: receiving a change in the defined portion of the graphical display of the display screen to a second defined portion; and sending data describing contents of the second defined portion of the graphical display of the display screen to the client device over the network.

In Example 71, the subject matter of any one or more of Examples 67-70 optionally include wherein the operations further comprise: storing the received information on the user-initiated input event in an event queue; and prior to consuming the modified information on the user-initiated input event, determining that a largest sequence number of events in the event queue is less than a sequence in the information on the user-initiated input event.

In Example 72, the subject matter of any one or more of Examples 67-71 optionally include wherein the operations further comprise: sending a thumbnail representation of the entire graphical display of the display screen to the client device over the network.

Example 73 is a machine-readable medium comprising instructions, which when performed by a machine, cause the machine to perform operations comprising: sending data describing contents of a defined portion of a graphical display of a display screen to a client device over a network; receiving information on a user-initiated input event from the client device; modifying client space coordinates in the received information to server space coordinates based upon a size of the defined portion; consuming the modified information on the user-initiated input event as if it were an input generated locally; updating the display screen based upon the modified information; and sending data describing contents of the defined portion of the updated graphical display of the display screen to the client device over a network.

In Example 74, the subject matter of Example 73 optionally includes wherein the operations further comprise: sending an acknowledgement to the client responsive to receiving the information on a user-initiated input event from the client device.

In Example 75, the subject matter of any one or more of Examples 73-74 optionally include wherein the operations further comprise: encoding the data describing contents of the defined portion of the graphical display of the display screen to the client device over the network using a video codec.

In Example 76, the subject matter of any one or more of Examples 73-75 optionally include wherein the operations further comprise: receiving a change in the defined portion of the graphical display of the display screen to a second defined portion; and sending data describing contents of the second defined portion of the graphical display of the display screen to the client device over the network.

In Example 77, the subject matter of any one or more of Examples 73-76 optionally include wherein the operations further comprise: storing the received information on the user-initiated input event in an event queue; and prior to consuming the modified information on the user-initiated input event, determining that a largest sequence number of events in the event queue is less than a sequence in the information on the user-initiated input event.

In Example 78, the subject matter of any one or more of Examples 73-77 optionally include wherein the operations further comprise: sending a thumbnail representation of the entire graphical display of the display screen to the client device over the network.

What is claimed is:

1. A computing device comprising:
   a processor;
   a memory coupled to the processor and comprising instructions, which when performed by the processor, causes the computing device to perform operations comprising:
      receiving from a server device, first data describing a portion of a graphical display rendered by the server device and displayed on a first display communicatively coupled to the server device;
      rendering the portion of the graphical display of the server device on a second display communicatively coupled to the computing device using the received first data, the second display a touchscreen display;
      receiving an input from the second display;
      sending data describing the input to the server device;
      rendering, on the second display, a first visual representation of the input on the portion of the graphical display of the server device displayed on the second display and at a position of the input;
      receiving from the server device, subsequent to rendering the first visual representation, second data describing the portion of the graphical display rendered by the server device, the second data sent by the server device after processing of the input, the second data describing a second visual representation of the input, the first and second visual representations appearing different on the second display;
      stopping the rendering of the first visual representation; and
      rendering the portion of the graphical display of the server device on the second display using the second received data, including rendering the second visual representation of the input.

2. The computing device of claim 1, wherein the operations of stopping the rendering of the first visual representation comprises stopping the rendering of the first visual representation responsive to receiving the second data.

3. The computing device of claim 1, wherein the operations of stopping the rendering of the first visual representation comprises stopping the rendering of the first visual representation responsive to expiry of a timer set upon rendering the first visual representation.

4. The computing device of claim 1, wherein a color of the first visual representation and second visual representation are different.

5. The computing device of claim 1, wherein a line style of the first visual representation and second visual representation are different.

6. The computing device of claim 1, wherein alpha values of the first visual representation and second visual representation are different.

7. The computing device of claim 1, wherein brush patterns of the first visual representation and second visual representation are different.

8. The computing device of claim 1, wherein the first visual representation is a visual cue that the input is not yet consumed by the server device.

9. The computing device of claim 1, wherein the operations comprise translating coordinates of the input into server coordinates based upon the coordinates of the input and information about the portion of the graphical display of the server device described by the first data.

10. The computing device of claim 1, wherein the first data is in a compressed video codec format.

11. A non-transitory machine-readable medium storing instructions, when performed by a computing device, causes the computing device to perform operations comprising:
   receiving from a server device, first data describing a portion of a graphical display rendered by the server device and displayed on a first display communicatively coupled to the server device;
   rendering the portion of the graphical display of the server device on a second display communicatively coupled to the computing device using the received first data, the second display a touchscreen display;
   receiving an input from the second display;
   sending data describing the input to the server device;
   rendering, on the second display, a first visual representation of the input on the portion of the graphical display of the server device displayed on the second display and at a position of the input;
   receiving from the server device, subsequent to rendering the first visual representation, second data describing the portion of the graphical display rendered by the server device, the second data sent by the server device after processing of the input, the second data describing a second visual representation of the input, the first and second visual representations appearing different on the second display;
   stopping the rendering of the first visual representation; and
   rendering the portion of the graphical display of the server device on the second display using the second received data, including rendering the second visual representation of the input.

12. The non-transitory machine-readable medium of claim 11, wherein the operations of stopping the rendering of the first visual representation comprises stopping the rendering of the first visual representation responsive to receiving the second data.

13. The non-transitory machine-readable medium of claim 11, wherein the operations of stopping the rendering of the first visual representation comprises stopping the rendering of the first visual representation responsive to expiry of a timer set upon rendering the first visual representation.

14. The non-transitory machine-readable medium of claim 11, wherein one or more of: a color of the first visual representation and second visual representation are different, a line style of the first visual representation and second visual representation are different, alpha values of the first visual representation and second visual representation are different, or brush patterns of the first visual representation and second visual representation are different.

15. The non-transitory machine-readable medium of claim 11, wherein the first visual representation is a visual cue that the input is not yet consumed by the server device.

16. The non-transitory machine-readable medium of claim 11, wherein the operations comprise translating coordinates of the input into server coordinates based upon the coordinates of the input and information about the portion of the graphical display of the server device described by the first data.

17. The non-transitory machine-readable medium of claim 11, wherein the first data is in a compressed video codec format.

18. A method performed by one or more hardware processors of a computing device, the method comprising:
   receiving from a server device, first data describing a portion of a graphical display rendered by the server device and displayed on a first display communicatively coupled to the server device;
   rendering the portion of the graphical display of the server device on a second display communicatively coupled to the computing device using the received first data, the second display a touchscreen display;
   receiving an input from the second display;
   sending data describing the input to the server device;
   rendering, on the second display, a first visual representation of the input on the portion of the graphical display of the server device displayed on the second display and at a position of the input;
   receiving from the server device, subsequent to rendering the first visual representation, second data describing the portion of the graphical display rendered by the server device, the second data sent by the server device after processing of the input, the second data describing a second visual representation of the input, the first and second visual representations appearing different on the second display;
   stopping the rendering of the first visual representation; and
   rendering the portion of the graphical display of the server device on the second display using the second received data, including rendering the second visual representation of the input.

19. The method of claim 18, wherein stopping the rendering of the first visual representation comprises stopping the rendering of the first visual representation responsive to receiving the second data.

20. The method of claim 18, wherein stopping the rendering of the first visual representation comprises stopping the rendering of the first visual representation responsive to expiry of a timer set upon rendering the first visual representation.

* * * * *